United States Patent
Freeman et al.

(10) Patent No.: US 6,450,407 B1
(45) Date of Patent: Sep. 17, 2002

(54) CHIP CARD REBATE SYSTEM

(75) Inventors: Gary A. Freeman, Newton, MA (US); David H. Freeman, Tampa, FL (US)

(73) Assignee: Viztec, Inc., Tampa, FL (US)

( * ) Notice: Subject to any disclaimer, the term of this patent is extended or adjusted under 35 U.S.C. 154(b) by 0 days.

(21) Appl. No.: 09/556,140

(22) Filed: Apr. 21, 2000

Related U.S. Application Data

(63) Continuation-in-part of application No. 09/457,988, filed on Dec. 9, 1999, which is a continuation of application No. 09/061,879, filed on Apr. 17, 1998, now Pat. No. 6,068,183.

(51) Int. Cl.$^7$ .............................................. G06K 19/06
(52) U.S. Cl. ........................ 235/492; 235/376; 235/487; 705/14; 705/16
(58) Field of Search ................................ 235/492, 487, 235/376; 705/14, 16

(56) References Cited

U.S. PATENT DOCUMENTS

| | | | |
|---|---|---|---|
| 4,120,053 A | 10/1978 | Nemirofsky | 2/115 |
| 4,380,699 A | 4/1983 | Monnier et al. | 235/492 |
| 4,670,664 A | 6/1987 | Hara | 307/150 |
| 4,670,853 A | 6/1987 | Stepien | 364/705 |
| 4,674,041 A | 6/1987 | Lemon et al. | 364/401 |
| 4,677,657 A | 6/1987 | Nagata et al. | 379/63 |
| 4,692,601 A | 9/1987 | Nakano | 235/380 |
| 4,704,003 A | 11/1987 | Komaki | 350/344 |
| 4,746,787 A | 5/1988 | Suto et al. | 235/379 |

(List continued on next page.)

FOREIGN PATENT DOCUMENTS

WO 00/05670 2/2000

OTHER PUBLICATIONS

"Card payphone for public use. China: Shenzhen Shenda to unveil payphone card", Telecom Sources (XED), Sep. 1997.

"A Commercial lawyer's take on the electronic purse: an analysis of commercial law issues with stored–value cards and electronic money," Business Lawyer (Feb. 1997).

"A contactless multiservice system—Technology transfer," Innovation Industries/Roland Moreno Technology, product new release, Paris, France, 3 pages (1997).

(List continued on next page.)

*Primary Examiner*—Thien M. Le
*Assistant Examiner*—Seung H. Lee
(74) *Attorney, Agent, or Firm*—Fish & Richardson P.C.

(57) ABSTRACT

A method and system for providing advertisement information, including advertising as well as sales promotions, on chip cards that additionally involves an electronic money rebate to the consumer, and for the distribution, accounting, and recovery of the associated electronic money rebates. Rebates are conveyed to the consumer by communication from the advertisement information provider to a customer's chip card via a multiplicity of possible channels including: a personal computer, a portable chip card reader, a point-of-sale (POS) terminal, a handheld device, a home or business telephone, a vending machine, a cellular phone, a pager, a mass transporation payment station, a television and/or television set-top box, or an automated teller machine (ATM). Rather than giving a discount at the point of sale, a rebate in the form of electronic money is stored in chip card memory. The method and system also include tracking and storing integrated relational information regarding advertisement information, products, and customer's buying habits with respect to those products for which rebates have been given. Determination of which particular advertisement information and rebates to store onto the card may be based on customer information available to the providers of the advertisement information. The chip card may or may not incorporate an electronic display for showing the advertisement information directly on the card.

46 Claims, 5 Drawing Sheets

U.S. PATENT DOCUMENTS

| | | | |
|---|---|---|---|
| 4,749,982 A | 6/1988 | Rikuna et al. | 340/146.2 |
| 4,754,418 A | 6/1988 | Hara | 364/708 |
| 4,791,281 A | 12/1988 | Johnsen et al. | 235/383 |
| 4,797,542 A | 1/1989 | Hara | 235/380 |
| 4,868,376 A | 9/1989 | Lessin et al. | 235/492 |
| 4,876,441 A | 10/1989 | Hara et al. | 235/488 |
| 4,882,675 A | 11/1989 | Nichtberger et al. | 364/401 |
| D305,023 S | 12/1989 | Suto | D14/117 |
| 4,896,791 A | 1/1990 | Smith | 221/7 |
| 4,910,672 A | 3/1990 | Off et al. | 364/405 |
| 4,941,090 A | 7/1990 | McCarthy | 364/405 |
| 4,949,256 A | 8/1990 | Humble | 364/401 |
| 4,954,985 A | 9/1990 | Yamazaki | 365/108 |
| 5,025,139 A | 6/1991 | Halliburton, Jr. | 235/379 |
| 5,047,614 A | 9/1991 | Bianco | 235/385 |
| 5,055,968 A | 10/1991 | Nishi et al. | 361/395 |
| 5,056,019 A | 10/1991 | Schultz et al. | 364/405 |
| 5,081,852 A | 1/1992 | Cox | 63/3 |
| 5,117,355 A | 5/1992 | McCarthy | 364/405 |
| 5,128,752 A | 7/1992 | Von Kohorn | 358/84 |
| 5,142,510 A | 8/1992 | Rodda | 367/163 |
| 5,146,068 A | 9/1992 | Ugawa et al. | 235/441 |
| 5,155,591 A | 10/1992 | Wachob | 358/86 |
| 5,173,851 A | 12/1992 | Off et al. | 364/401 |
| 5,185,695 A | 2/1993 | Pruchnicki | 364/401 |
| 5,192,854 A | 3/1993 | Counts | 235/375 |
| 5,200,889 A | 4/1993 | Mori | 364/401 |
| 5,202,826 A | 4/1993 | McCarthy | 364/405 |
| 5,220,501 A | 6/1993 | Lawlor et al. | 364/408 |
| 5,245,533 A | 9/1993 | Marshall | 364/401 |
| 5,249,044 A | 9/1993 | Von Kohorn | 358/86 |
| 5,276,311 A | 1/1994 | Hennige | 235/380 |
| 5,287,181 A | 2/1994 | Holman | 348/473 |
| 5,287,268 A | 2/1994 | McCarthy | 364/405 |
| 5,295,064 A | 3/1994 | Malec et al. | 365/401 |
| 5,305,195 A | 4/1994 | Murphy | 364/401 |
| 5,305,197 A | 4/1994 | Axler et al. | 364/401 |
| 5,315,377 A | 5/1994 | Isono et al. | 348/51 |
| 5,353,218 A | 10/1994 | De Lapa et al. | 364/401 |
| 5,359,183 A | 10/1994 | Skodlar | 235/493 |
| 5,380,991 A | 1/1995 | Valencia et al. | 235/383 |
| RE34,915 E | 4/1995 | Nichtberger et al. | 364/401 |
| 5,412,416 A | 5/1995 | Nemirofsky | 348/10 |
| 5,420,606 A | 5/1995 | Begum et al. | 345/156 |
| 5,450,938 A | 9/1995 | Rademacher | 194/206 |
| 5,467,269 A | 11/1995 | Flaten | 364/401 |
| 5,477,038 A | 12/1995 | Levine et al. | 235/380 |
| 5,500,681 A | 3/1996 | Jones | 348/473 |
| 5,502,636 A | 3/1996 | Clarke | 364/401 |
| 5,515,098 A | 5/1996 | Carles | 348/8 |
| 5,517,011 A | 5/1996 | Vandenengel | 235/441 |
| 5,537,314 A | 7/1996 | Kanter | 364/406 |
| 5,557,516 A | 9/1996 | Hogan | 364/406 |
| 5,557,721 A | 9/1996 | Fite et al. | 395/148 |
| 5,558,957 A | 9/1996 | Datta et al. | 429/127 |
| 5,566,353 A | 10/1996 | Cho et al. | 455/2 |
| 5,590,038 A | 12/1996 | Pitroda | 395/241 |
| 5,594,493 A | 1/1997 | Nemirofsky | 348/13 |
| 5,612,868 A | 3/1997 | Off et al. | 364/214 |
| 5,621,812 A | 4/1997 | Deaton et al. | 382/100 |
| 5,625,477 A | 4/1997 | Wu et al. | 349/35 |
| 5,636,044 A | 6/1997 | Yuan et al. | 349/142 |
| 5,636,346 A | 6/1997 | Saxe | 395/201 |
| 5,638,194 A | 6/1997 | Yamada et al. | 349/86 |
| 5,642,484 A | 6/1997 | Harrison, III et al. | 395/214 |
| 5,642,485 A | 6/1997 | Deaton et al. | 395/214 |
| 5,644,723 A | 7/1997 | Deaton et al. | 395/214 |
| 5,649,114 A | 7/1997 | Deaton et al. | 395/214 |
| 5,682,294 A | 10/1997 | Horejs, Jr. et al. | 361/737 |
| 5,687,322 A | 11/1997 | Deaton et al. | 395/214 |
| 5,693,956 A | 12/1997 | Shi et al. | 257/40 |
| 5,703,755 A | 12/1997 | Flesher et al. | 361/737 |
| 5,710,886 A | 1/1998 | Christensen et al. | 395/214 |
| 5,724,424 A | 3/1998 | Gifford | 380/24 |
| 5,724,521 A | 3/1998 | Dedrick | 395/226 |
| 5,727,153 A | 3/1998 | Powell | 395/214 |
| 5,729,693 A | 3/1998 | Holda-Fleck | 395/214 |
| 5,734,154 A | 3/1998 | Jachimowicz et al. | 235/492 |
| 5,740,549 A | 4/1998 | Reilly et al. | 705/14 |
| 5,761,601 A | 6/1998 | Nemirofsky et al. | 455/3.1 |
| 5,761,648 A | 6/1998 | Golden et al. | 705/14 |
| 5,767,896 A | 6/1998 | Nemirofsky | 348/13 |
| 5,770,849 A | 6/1998 | Novis et al. | 235/492 |
| 5,774,870 A | 6/1998 | Storey | 705/14 |
| 5,777,903 A | 7/1998 | Piosenka et al. | 364/700 |
| 5,789,732 A | 8/1998 | McMahon et al. | 235/487 |
| 5,794,210 A | 8/1998 | Goldhaber et al. | 705/14 |
| 5,796,952 A | 8/1998 | Davis et al. | 395/200.54 |
| 5,804,803 A | 9/1998 | Cragun et al. | 235/375 |
| 5,804,806 A | 9/1998 | Haddad et al. | 235/383 |
| 5,806,044 A | 9/1998 | Powell | 705/14 |
| 5,806,045 A | 9/1998 | Biorge et al. | 705/14 |
| 5,816,918 A | 10/1998 | Kelly et al. | 463/16 |
| 5,822,735 A | 10/1998 | DeLapa et al. | 705/14 |
| 5,822,737 A | 10/1998 | Ogram | 705/26 |
| 5,823,575 A | 10/1998 | Ives | 283/58 |
| 5,832,457 A | 11/1998 | O'Brien et al. | 705/14 |
| 5,841,738 A | 11/1998 | Kamei et al. | 368/205 |
| 5,845,259 A | 12/1998 | West et al. | 705/14 |
| 5,850,217 A | 12/1998 | Cole | 345/326 |
| 5,852,775 A | 12/1998 | Hidary | 455/404 |
| 5,855,008 A | 12/1998 | Goldhaber et al. | 705/14 |
| 5,857,079 A | 1/1999 | Claus et al. | 704/33 |
| 5,857,175 A | 1/1999 | Day et al. | 705/14 |
| 5,870,030 A | 2/1999 | DeLuca et al. | 340/825.44 |
| 5,880,769 A | 3/1999 | Nemirofsky et al. | 348/12 |
| 5,884,271 A | 3/1999 | Pitroda | 705/1 |
| 5,884,277 A | 3/1999 | Khosla | 705/14 |
| 5,884,278 A | 3/1999 | Powell | 705/14 |
| 5,887,271 A | 3/1999 | Powell | 705/14 |
| 5,890,135 A | 3/1999 | Powell | 705/14 |
| 5,903,874 A | 5/1999 | Leonard et al. | 705/14 |
| 5,907,350 A | 5/1999 | Nemirofsky | 348/13 |
| 5,907,830 A | 5/1999 | Engel et al. | 705/14 |
| 5,907,831 A | 5/1999 | Lotvin et al. | 705/14 |
| 5,915,007 A | 6/1999 | Klapka | 379/144 |
| 5,918,211 A * | 6/1999 | Sloane | 705/16 |
| 5,923,016 A | 7/1999 | Fredregill et al. | 235/380 |
| 5,924,078 A | 7/1999 | Naftzger | 705/16 |
| 5,924,080 A | 7/1999 | Johnson | 705/26 |
| 5,932,869 A | 8/1999 | Gottlich et al. | 235/493 |
| 5,933,811 A | 8/1999 | Angles et al. | 705/14 |
| 5,937,390 A | 8/1999 | Hyodo | 705/14 |
| 5,937,392 A | 8/1999 | Alberts | 705/14 |
| 5,948,061 A | 9/1999 | Merriman et al. | 709/219 |
| 5,950,173 A | 9/1999 | Perkowski | 705/26 |
| 5,953,047 A | 9/1999 | Nemirofsky | 348/13 |
| 5,955,961 A | 9/1999 | Wallerstein | 340/825.33 |
| 5,956,694 A | 9/1999 | Powell | 705/14 |
| 5,960,409 A | 9/1999 | Wexler | 705/14 |
| 5,970,469 A | 10/1999 | Scroggie et al. | 705/14 |
| 5,970,470 A * | 10/1999 | Walker et al. | 705/14 |
| 5,974,399 A | 10/1999 | Giuliani et al. | 705/14 |
| 5,983,069 A | 11/1999 | Cho et al. | 455/3.1 |
| 5,983,196 A | 11/1999 | Wendkos | 705/14 |
| 5,983,200 A | 11/1999 | Slotznick | 705/26 |
| 5,987,132 A | 11/1999 | Rowney | 380/24 |
| 5,991,376 A | 11/1999 | Hennessy et al. | 379/114 |
| 5,992,888 A | 11/1999 | North et al. | 283/56 |
| 5,999,908 A | 12/1999 | Abelow | 705/1 |
| 6,000,608 A | 12/1999 | Dorf | 235/380 |

| | | | |
|---|---|---|---|
| 6,002,771 A | 12/1999 | Nielsen | 380/49 |
| 6,006,988 A | 12/1999 | Behrmann et al. | 235/379 |
| 6,009,411 A | 12/1999 | Kepecs | 705/14 |
| 6,009,412 A | 12/1999 | Storey | 705/14 |
| 6,012,038 A | 1/2000 | Powell | 705/14 |
| 6,012,635 A | 1/2000 | Shimada et al. | 235/380 |
| 6,014,634 A | 1/2000 | Scroggie et al. | 705/14 |
| 6,014,635 A | 1/2000 | Harris et al. | 705/14 |
| 6,018,718 A | 1/2000 | Walker et al. | 705/14 |
| 6,026,370 A | 2/2000 | Jermyn | 705/14 |
| 6,032,136 A | 2/2000 | Brake, Jr. et al. | 705/41 |
| 6,035,280 A | 3/2000 | Christensen | 705/14 |
| 6,038,244 A | 3/2000 | Finsterwald | 235/375 |
| 6,038,552 A | 3/2000 | Fleischl et al. | 705/44 |
| 6,041,309 A | 3/2000 | Laor | 705/14 |
| 6,047,067 A | 4/2000 | Rosen | 380/24 |
| 6,050,494 A | 4/2000 | Song et al. | 235/492 |
| 6,055,509 A | 4/2000 | Powell | 705/14 |
| 6,055,513 A | 4/2000 | Katz et al. | 705/26 |
| 6,055,573 A | 4/2000 | Gardenswartz et al. | 709/224 |
| 6,149,778 A | 4/2000 | Walker et al. | 705/14 |
| 6,057,872 A | 5/2000 | Candelore | 348/3 |
| 6,065,675 A | 5/2000 | Teicher | 235/380 |
| 6,067,526 A | 5/2000 | Powell | 705/14 |
| 6,068,183 A | 5/2000 | Freeman et al. | 235/375 |
| 6,073,112 A | 6/2000 | Geerlings | 705/14 |
| 6,075,971 A | 6/2000 | Williams et al. | 455/5.1 |
| 6,076,068 A | 6/2000 | DeLapa et al. | 705/14 |
| 6,076,069 A | 6/2000 | Laor | 705/14 |
| 6,076,071 A | 6/2000 | Freeny, Jr. | 705/26 |
| 6,076,075 A | 6/2000 | Teicher | 705/41 |
| 6,088,682 A | 7/2000 | Burke | 705/17 |
| 6,105,001 A | 8/2000 | Masi et al. | 705/14 |
| 6,105,002 A | 8/2000 | Powell | 705/14 |
| 6,105,865 A | 8/2000 | Hardesty | 235/380 |
| 6,112,191 A | 8/2000 | Burke | 705/41 |
| 6,195,411 B1 | 8/2000 | Schrenk | 235/380 |
| 6,112,988 A | 9/2000 | Powell | 235/383 |
| 6,119,098 A | 9/2000 | Guyot et al. | 705/14 |
| 6,119,099 A | 9/2000 | Walker et al. | 705/16 |
| 6,119,933 A | 9/2000 | Wong et al. | 235/380 |
| 6,119,945 A | 9/2000 | Muller et al. | 235/492 |
| 6,119,946 A | 9/2000 | Teicher | 235/492 |
| 6,128,599 A | 10/2000 | Walker et al. | 705/14 |
| 6,128,663 A | 10/2000 | Thomas | 709/228 |
| 6,129,274 A | 10/2000 | Suzuki | 235/381 |
| 6,131,811 A | 10/2000 | Gangi | 235/380 |
| 6,134,532 A | 10/2000 | Lazarus et al. | 705/14 |
| 6,138,105 A | 10/2000 | Walker et al. | 705/10 |
| 6,138,911 A | 10/2000 | Fredregill et al. | 235/383 |
| 6,178,407 B1 | 1/2001 | Lotvin et al. | 705/14 |
| 6,321,208 B1 * | 11/2001 | Barnett et al. | 705/14 |

OTHER PUBLICATIONS

ActiveAds, "How ActiveAds Works", http://www.thethinkingmedia.com/activeads/how.html, printed from internet Mar. 15, 2000.

"A Short History of Coupons and Other Information Coupon Clippers Want to Know", (http://www.couponpros.org/area2/history.htm), download date: Apr. 2, 2000.

"Auto Dealer to Test Coupon Chip Card Program," Card Technology Daily News, (http://cardtech.faulknergray.com/news.htm), download data: Apr. 10, 2000.

Bakke, "Cram a walletful of information into one Card with a brain; computerized credit cards," Popular Science, Times Mirror Magazines Inc. (Jul. 1983).

"Beenz.com Launches Reloadable Debit Card," Cardfax (Apr. 27, 2000).

Benedetti, "Battelle System may replace coupons," Central Ohio Source News & Special Reports, (http://centralohio-.thesource.net/97/feb/263.html) (Feb. 26, 1997).

Blalock, "Building a Better Coupon," Grocery Headquarters (Mar. 1998).

"Brodbeck's Pot of Gold," Card Marketing (Dec. 1999).

Charlish, "US and Japan Step Smartly Ahead," The Financial Times Limited (Nov. 12, 1986).

Common Electronic Purse Specifications, CEPSCO, Version 2.1 (Sep. 1999).

Company Information on In Store Media Systems Inc. (http://www.stockir.com/isms/coinfo.html) download date: Apr. 1, 2000.

"Coupons—A Complete Guide: Joint Industry Coupon Guidelines," Grocery Manufacturers of America, Inc. (1998).

"Cybermark Introduces Loyalty Application for Auto Dealership; E–Commerce Company Integrates Smart Card Application With Internet for Service Industries," PR Newswire (Feb. 15, 2000).

Dimitrakopoulos et al., Low–Voltage Organic Transistors on Plastic Comprising High–Dielectric Constant Gate Insulators, Science 283:822–824 (Feb. 5, 1999).

"Distributing E–Coupons on the Internet," (http://198.6.250.9/inet99/proceedings/1d/1d_1.htm), download date: April 2, 2000.

Doane et al., "Reflective Cholesteric Liquid–Crystal Displays," Information Display (Dec. 1996).

Drug Store Newsfirst, "Longs launches Internet coupons," A Lebhar–Friedman Inc. Publication (Feb. 17, 1998).

"Electronic Coupon Clearing Guidelines," Grocery Manufacturers of America, Inc. (1998).

EMV '96 Integrated Circuit Card Specification for Payment Systems, Version 3.1.1 (May 31, 1998).

"Electronic Coupon Clearing Guidelines," Grocery Manufacturers of America, Inc. (1998).

European Committee for Banking Standards, Technical Committee Draft: The Interoperable Financial Sector Electronic Purse, Part I: Functional Description [TCD110–1] (Jun. 19, 1998).

European Committee for Banking Standards, Technical Committee Draft: The Interoperable Financial Sector Electronic Purse, Part 2: Security Architecture [TCD110–2] (Jun. 19, 1998).

European Committee for Banking Standards, Technical Committee Draft: The Interoperable Financial Sector Electronic Purse, Part 3: Transaction Description and Message Flow [TCD110–3] (Jun. 19, 1998).

European Committee for Banking Standards, Technical Committee Draft: The Interoperable Financial Sector Electronic Purse, Part 4: Detailed Functional Description [TCD110–4] (Jun. 19, 1998).

European Committee for Banking Standards, Technical Committee Draft: The Interoperable Financial Sector Electronic Purse, Part 5: Data Dictionary [TCD110–5] (Jun. 19, 1998).

"Ferroelectric LCDs," published Jun. 1991; HTML: Aug. 30, 1995; JTEC/WTEC Hyper–Librarian, file:///C/My Documents/Gary/smart card/ferro_1.htm, printed from Internet Sep. 14, 1997.

"First USA to Introduce Loyalty Program," Card Technology Data News, (http://cardtech.faulknergray.com/news.htm), download data: Apr. 10, 2000.

Flat Panels' Flexible Future, The Clock (Dec. 1999).

Frenkel, "Smart cards, dumb problems," Forbes, Inc. (Nov. 5, 1984).

"Gift Certificate Maker to Scrap Paper in Favor of Smart Cards," Card Technology Daily News, (http://cardtech-.faulknergray.com/news.htm), download date: Apr. 1, 2000.

Haddad, "Using Smart Cards to Gain Market Share," Gower Publishing Limited (2000).

"Hard to Handle Coupons," (http://www.santella.com/hardto1.htm), download date: Apr. 2, 2000.

Homer, "Focus: Too Soon To Bank on Cybercash," The Independent (London) (Oct. 20, 1999).

"Industry Information" on In Store Media Systems, Inc., Card Technology Daily News, (http://www.stockir.com/isms/indusinfo.htm), download date: Apr. 1, 2000.

"Infineer Demonstrates SmartCommerce," Analyses & Syntheses (May 11, 2000).

Krummert, "Smart Card, Smart Choice: How Restaurants are Profiting from Credit Cards," Restaurant Hospitality (Nov. 1, 1999).

Kutler, "Thomas Cook to Use Smart Card Technology; UltiCards are Called First to Combine Travel and Financial Services Functions," The American Banker (May 12, 1988).

Kutler, "'UltiCard' Developers Hope to Make Smart Card Debate Obsolete," The American Banker (Jul. 23, 1986).

Landau, "Smart Marketing: The Real Killer App," Card Technology (Nov. 1999).

Linstedt, "Redeeming Values Only 2% of Coupons Printed Get Redeemed, but That Saves Consumers $3.6 Billion A Year," Buffalo News (Mar. 9, 1999).

"Marketing with Coupons: Guidelines for Cost and Benefits Analysis," Grocery Manufacturers of America, Inc., and Arthur Anderson LLP (1998).

Merkert, "The Scoop on Chips," Moneycard Collector (Jan. 27, 1998).

"Mondex Combines Cash With Internet Currency," Card Technology Daily News, (http://cardtech.faulknergray.com/news.htm), download date: Apr. 10, 2000.

Noth, "Even Cybersurfers Gotta Eat: A Look at the State of the Art in Food Couponing," The Digital Edge, (http://www.digitaledge.org/monthly/1999_02/foodcoup.html), download date: Apr. 2, 2000.

Parker, "Thinking Media combines Whiz–Bang Banners with Rock–Solid Numbers," New Paradigm Communications Inc. (Dec. 4, 1998).

"Polymer–dispersed LCDs," http://stefan.www.media.mit.edu/people/stefan/liquid–crystals/node9.html, printed from Internet Sep. 17, 1997.

PR Newswire (Oct. 13, 1986).

"Publicard to Sell Three Companies to Focus on Digital TV Market," Card Technology Daily News, (http://www-.cardtech.faulknergray.com/news.htm), download date: Apr. 10, 2000.

"Schlumberger and Welcome Real–Time Team to Boost Smart Payment Card Usage with Complete Loyalty Solution," Business Wire (Dec. 6, 1999).

"Smart Card Set–Up Introduces Loyalty Program," Card Technology Daily News, (http://cardtech.faulknergray.com/news.htm), download date: Apr. 10, 2000.

"Smart Cards: Buying Via Cable Lines," American Banker (Mar. 1, 2000).

Smith, "The Coupon Issue", Supermarket News (Mar. 29, 1999).

"The Calculator that could be a Credit Card," Business Week (Nov. 14, 1983).

Tucker, Randy, "Coupons not keeping up brisk clip," The Cincinnati Enquirer (http://enquirer.com/editions/1999/02/14/fin_coupons_not_keeping.html) (Feb. 14, 1999).

"Welcome Real–Time Launches e–couponing Portal Technology," Analyses & Syntheses (Apr. 20, 2000).

Wellborn, "A microchip to bring plastic junkies to their knees; Raising the intelligence of credit cards," U.S. News & World Report (Feb. 2, 1987).

Yaniv, "Reflective Cholesteric Displays," Information Display (Oct. 1995).

Yuan, "Bistable Reflective Cholesteric Displays," article (no publication name or date).

* cited by examiner

CHIP CARD REBATE SYSTEM

CROSS-REFERENCE TO RELATED APPLICATIONS

This application is a continution in part of U.S. application Ser. No. 09/457,988, filed on Dec. 9, 1999 incorporated herin by reference which is a continuation of 09/061,879 filed on Apr. 17, 1998, now 6,068,183 U.S. Pat. No. 6,019, 284, and U.S. Application Ser. No. 09/457,990, also incorporated herein by reference.

BACKGROUND OF THE INVENTION

This invention relates to providing advertisement information, including advertising as well as sales promotions, on chip cards (sometimes called "smart cards") that additionally involve an electronic money rebate to the consumer, and to the distribution, redemption, and processing of the associated electronic money rebate.

Advertisement, Promotion, and Coupon Background

Co-pending U.S. patent application Ser. No. 09/061,879, filed Apr. 17, 1998, entitled "CHIP CARD SYSTEM", describes delivery of "advertisement information" to chip cards. "Advertisement information" includes two distinct elements: (1) advertising, and (2) sales promotions (which, together, is referred to herein synonymously as "advertisement information" or an "ASP").

Advertising is widely recognized as a communication, usually by an identified sponsor, of a persuasive message about, products, ideas, and/or services to an audience. Advertisers commonly seek to enhance components of their "brand", which include awareness, image, positioning, preference, and loyalty. Advertisers generally try to increase sales of the advertised product or service (or improve the acceptance of an idea or concept conveyed by the advertising) by persuading the audience to choose their brand.

Many successful advertising campaigns employ a memorable slogan or catch phrase that is utilized as the advertising's persuasive element. The slogan or catch phrase is often used over long periods of time to enhance the various components of the advertiser's "brand". In some cases the slogan or catch phrase is used over decades. Nike's™ "Just Do It" ™, Avis'™ "We Try Harder"™, and Wheaties'™ "Breakfast of Champions"™ are other well-known examples of persuasive advertising slogans that have formed the basis for highly successful advertising campaigns. Many successful advertising campaigns also use memorable images or icons to help make their advertisements persuasive and compelling. Examples of persuasive images or icons include the familiar Nike™ "swoosh"™ mark, the Eveready™ Energizer Bunny™, and Kellogg's™ Tony the Tiger™.

Persuasive appeal to the audience's emotions and feelings is an element frequently found in advertising. Examples of these emotions and feelings can include, among many others, one's sense of romance, fun, adventure, style, accomplishment, desire, humor, confidence, nostalgia, curiosity, and determination. Miller Lite's™ "Taste's great, less filling"™ series of advertisements appealed to one's sense of humor and successfully persuaded consumers to purchase more Miller Lite™ beer. Another famous example is the U.S. Army's™ long running "Be all that you can be"™ advertising campaign, which appealed to one's sense of determination and adventure to persuade more individuals to join the Army.

The other component of "advertisement information" is sales promotions. Sales promotions are typically short-term incentives designed to prompt immediate action on the part of the consumer to purchase a service or product. Examples of sales promotions include rebates, samples, contests, and discount coupons. Sales promotions generally entail a person receiving something that has some monetary value such as a coupon or free product sample. Sales promotions can also involve a person merely hoping to receive something of economic value, such as contest winnings.

Advertising and sales promotions are frequently used together as part of a complete marketing program for a product or service because of the distinct advantages offered by each. For example, the makers of Wonder Bread™ might utilize a coupon sales promotion in an attempt to quickly attract customers who typically purchase other breads. At the same time, the makers of Wonder Bread™ might use an advertising campaign that seeks to build their "brand" by repeatedly using a persuasive slogan such as "Wonder helps build bodies 12 ways"™, which may help create brand loyalty by appealing to the consumer's desire to become strong and healthy by eating Wonder Bread™.

Coupons have historically been one of the most widely used forms of sales promotions. Coupons generally offer the consumer a discount for purchasing a product or service. There are three basic types of coupons: (1) manufacturer's coupons (which areusually redeemed through participating retailers); (2) store coupons; and (3) in-ad coupons.

Coupon Industry Terms (quoted from Coupons—A Complete Guide: Joint Industry Coupon Guidelines, Joint Industry Coupon Committee, Grocery Manufacturers of America, Wash. D.C., 1998.)

Manufacturer's Coupons—Coupons issued by a manufacturer offering consumers a specific amount off the purchase price of one or more of the manufacturer's products. The coupons may be distributed through a variety of media—in the manufacturer's newspaper or magazine ads; in a free-standing insert, or on a product package, by mail or door-to-door delivery, etc.

Store Coupons—A coupon printed by a retailer and available to shoppers in the store, either in a special flyer or at the shelf or display where the couponed product is stocked.

In-ad coupons—Coupons in a particular retailer's newspaper ad or handbill that are redeemable on the specific product only at the particular store or chain. The coupons are usually issued under a special agreement between the retailer and the manufacturer of the product.

Free-standing insert (FSI)—A group of manufacturers'color advertisements (each of which usually includes a coupon) printed as a separate section and inserted into a local newspaper, usually the Sunday edition.

Redemption—The cashing-in of coupons when merchandise is purchased in order to obtain discounts or premiums.

Retail Clearinghouse—An independent company used by a retailer to sort, count and submit coupons for payment to manufacturers or their agents on behalf of the retailer.

Coupon Clearinghouse—Processes coupons from grocery and other stores and sends them to manufacturers or their agents for payment.

Cross Coupon—(Also called cross-ruff coupon.) A manufacturer's coupon that is placed inside a product or printed, on the package and is redeemable on the purchase of a different product.

Universal Product Code (U.P.C.)—A combination of vertical bars printed on product packages (or on coupons) that can be "read" by an electronic scanner at the checkout to identify the item, automatically look up the item's price (or the coupon's value) in a computer, and instantaneously ring-up the price (or the value) on the cash register.

Family Code—The three digit number found immediately after the manufacturer ID code on a coupon U.P.C. It is used to validate a coupon automatically against a specific product or group of products at the point-of-sale.

Refund or Rebate Certificate—A certificate issued by the manufacturer that offers consumers money back on the purchase price of a product. Usually after they mail some proof of purchase to the manufacturer.

Misredemption—Coupons that were not redeemed properly for the correct products in accordance with the stipulations printed on the particular coupon.

The media most commonly used to distribute coupons has been FSI's. For instance, FSI's delivered over 80% of grocery coupons in 1996. The other leading distribution media are handouts, magazines, newspapers, and direct mail. These types of sales promotions have traditionally been in the form of paper coupons and rebates which the consumer must, for instance, clip out of a newspaper or magazine. Consumers often clip and collect multiple coupons, store them in a purse or wallet, and take them to a store for redemption. At the store, the consumer presents the coupons at the cash register, where the coupons are verified and entered into the retailer's point-of-sale system manually or by scanning a UPC code on the coupon. Recent innovations have included incorporation of point-of sale scanning technology and the encoding of coupon information into coupon-specific UPC codes. Clearinghouses become involved in the process primarily because paper coupons are labor intensive and cumbersome and neither the manufacturer nor the retailer is interested in investing in supporting paper coupon processing.

Paper couponing has numerous disadvantages: (1) the manufacturer must pay the cost of printing and distributing the coupons and rebate forms to a mass audience, with the hope of getting a redemption rate of approximately two percent; (2) the manufacturer must pay the clearing house and the retailer for their role in handling and processing the redeemed coupons (retailers are usually paid about eight cents per coupon for handling costs): (3) the process of clipping coupons is very time consuming and inefficient for the consumer, as they have to sort through many offers that they have no interest in; (4) the coupon redemption process at the point-of-sale is very time consuming and slows down the retailer's check-out lines; (5) the retailer must pay the discount to the consumer immediately at the point-of-sale, while having to wait to be reimbursed by the manufacturer through the clearing house; and (6) there are high misredemption and fraud rates.

In recent years, there have been a number of improvements to the coupon distribution and redemption system to address some of these problems. Some companies now specialize in more targeted distribution of coupons by direct mail. In the last several years, the Internet has become a very popular mechanism for distributing coupons and rebates to consumers. Coupons distributed from the Internet will typically take the form of either coupons printed by a consumer's personal computer (Christenson U.S. Pat. No. 5,710,886) or loaded electronically onto a smart card (Powell U.S. Pat. No. 5,806,044). Distribution may also occur via a processing center in communication with both the website from which the consumer requested the coupon and the retailer at. which the consumer redeemed the coupon by purchasing the associated product (Kepecs U.S. Pat. No. 6,009,411).

Several companies now offer systems at the point-of-sale that provide the retailer with faster clearing of coupons. Some systems have the coupons fed into a machine which either electronically redeems the coupon and discounts the purchase price (and shreds the coupon so it cannot be reused), or the coupons are ejected from the machine if the UPC code does not match the consumer's current purchases.

Several systems have been developed which incorporate the use of chip cards (smart cards) for coupon distribution and redemption (Haddad U.S. Pat. No. 5,804,806; Powell U.S. Pat. No. 5,806,044; Valencia U.S. Pat. No. 5,380,991; Kepecs U.S. Pat. No. 6,009,411). The use of chip cards for couponing systems addresses the problems of customer convenience (no clipping is needed), more targeted distribution of coupons, misredemptions, fraud, high handling costs for the manufacturer and/or retailer, and speed of redemption at the point-of-sale.

The disadvantage of all these existing chip card couponing systems is that they utilize the conventional coupon redemption system, wherein the retailer initially pays for the cost of the discount, by reducing the purchase price that the retailer receives for the product or service. The manufacturer subsequently reimburses the retailer for the cost of the redeemed coupon. Typical delays from time of purchase to the retailer receiving reimbursement for the discount range from 1–3weeks.

Incentives may sometimes even take the form of paying the consumer to view advertisement information. For instance,, Goldhaber (U.S. Pat. No. 5,855,008) describes paying consumers for viewing advertisements, particularly Internet advertising.

Credit Card and Chip Card Background

Credit cards developed from oil company, restaurant and department store charging accounts which predated the present electronic systems by several decades. In the 1960s and 1970s, credit card usage expanded as consumer finance was made more readily available and became an important source of revenues for banks. Credit cards are similar to debit cards (and we use "credit card" herein to refer to both); they are distinguished from debit cards by having; access to a line of credit made available to the cardholder by the card issuer. They generally require four separate parties to each transaction: the cardholder, the merchant selling the goods or services, the merchant acquirer processing the credit card payment, and the card issuer. In certain cases, the merchant acquirer and credit card issuer will be the same company.

Credit cards can take the form of chip cards by the insertion of a microprocessor, memory, or both, into the card. This allows for storage and processing of data on the card itself. A stored-value chip card (sometimes termed an 'electronic purse' or 'e-purse') differs from a credit card or chip card without stored-value functionality in that the data stored on the card includes, in an encrypted format, data that represents a cash value. This stored digital cash value can e deducted from the card at the time of sale in a transaction that is strictly between the Point of Sale (POS) terminal and the stored-value chip card. At time of settlement and clearing (electronic data capture), usually conducted during off-hours, that digital cash value is transferred to the merchant's bank account via the traditional credit networks. The standard "EMV '96 Integrated Circuit Card Specification for Payment Systems Version 3.1.1 May 31, 1998" describes credit cards containing an integrated circuit (i.e. a nonstored-value chip card.) Systems have been developed for storing coupons and other sales promotions on chip cards (Powell, U.S. Pat. No. 5,806,044; Haddad, U.S. Pat. No. 5,804,806; Nemirofsky, U.S. Pat. No. 5,412,416).

Chip cards can be used in two types of operating environments: closed systems or open systems. A closed system is managed in a contained environment where there is a single card issuer, who also acts as the sole service provider. A proprietary card is issued to customers of the service provider for exclusive use at its facilities. Because the issuer, service provider, and also at times the acquirer are a single entity, there is no need for a system operator to clear transactions with other parties. Closed systems are typically used in applications such as transit systems, colleges and universities, public telephones, theme parks, military bases, prisons, and large corporations. An open system, on the other hand, accommodates multiple issuers and allows consumers to use their cards at multiple locations and merchants. Because there are multiple issuers and acquirers, an open system involves a greater degree of complexity than a closed one. An open system requires a clearing and settlement function to move funds between issuers and acquirers; demands greater security; and necessitates a standard infrastructure among all participants.

Credit Card Industry Terms

Merchant Acquiring Financial Institution—A bank or other financial institution that has a business relationship with a merchant and receives all credit card transactions from that merchant.

Card Issuing Financial Institution—A bank or other financial institution which issues credit cards to the customer.

Authorization—Approval of a credit card transaction for a merchant by the card-issuing bank.

Authorization Code—assigned by the card issuing bank to a credit card sale to show that the transaction is authorized.

Electronic Data Capture—Entering and processing the sales drafts by electronic methods. Typically, a credit card sale authorization is obtained at the time of the purchase, and then at night the sales draft is electronically captured by sending in batch the day's sales drafts from the Point of Sale (POS) terminal to be processed by the Acquirer. In online payment schemes, capture is used to denote the electronic deposit of the sales draft with the Acquiring bank.

Sales draft—An instrument showing an obligation on the cardholder's part to pay money, (i.e. the sale amount), to the card issuer. This is the piece of paper that you sign when making a purchase with your credit card.

Interchange (or transaction) Fee—A fee a credit institution charges in order to process a credit card transaction involving a cardholder's account. This fee is regulated by an institution such as MasterCard and Visa, and is a percentage of the total transaction amount. The exact definition of this will change depending on which institution is involved. (See table 1 below).

Discount (or disbursement) fee—A percentage of the retail sale paid as a fee to a credit institution for processing the credit card transaction. The exact definition of this will change depending on which institution is involved. (See table 1 below).

Payment Systems Background

Stored value is a relatively recent innovation to electronic payment systems. Stored value is an "intangible electronic obligation"(21$^{st}$ Century Money Banking and Commerce, Vartanian, Thomas, Fried, Frank, Harris, Shriver and Jacobson, Washington, D.C., 1998) stored on a computer, smart card, or other electronic storage device such as a personal digital assistant. Common examples of stored value systems are prepaid phone cards, mass transit cards, or electronic money stored on chip cards.

Depending on the context, the term "money" will take on different meanings. In the Uniform Commercial Code, money is defined as "a medium of exchange authorized or adopted by a foreign or domestic government," 1-201(24).

"Thus, the traditional parlance of commercial law, like common parlance, considers many forms of payment such as checks—to be substitutes for money rather than money itself." (Payment Systems and Credit Instruments, Gillette, Clayton, The Foundation Press, Inc., Westbury, N.Y., 1996.) This definition of money is often termed "legal tender", "currency", or "cash". In the economics literature, however, 'money' has a broader definition: it consists of whatever is accepted in exchange for goods and services. In the economists'definition, governmentally approved or issued currency constitutes only one subset of money, called 'fiat money.' (Id.) In describing the present invention, we use the term "electronic money" to mean the electronic equivalent of "money" in the economics literature, namely, whatever is accepted in exchange for goods and services, including government issued currency as well as checks and credit cards. Not included in this definition of "electronic money" are such things as loyalty rebate systems as exemplified by frequent flyer miles, or other loyalty point systems wherein the frequent flyer miles or other type of points accumulated can be traded in by the consumer for additional goods or services, and in some cases even for cash. Despite the fact that in some cases the loyalty points may be redeemed for cash, the points are not money within the scope of the present definition in two respects: (1) the face value they are assigned is in units other than monetary units, e.g. 'miles' or 'points', and only secondarily are these units equated with monetary value; and (2) the monetary value that is assigned to a 'point' or 'mile' is discounted from its barter value, for example, a consumer could redeem 1000 points for an item worth $100 in retail value, but if they were to redeem it for cash it might only be worth $20.

Electronic Purse Terms

An electronic purse or electronic wallet is an application program for managing, and memory locations for storing, electronic money on an electronic device. Typically the device is a chip card, but may also be a personal computer or other electronic device. Electronic purse schemes function the same as other chip card payment systems except for the additional function of loading electronic money onto the cards, a function that is not present in traditional credit card schemes.

Acceptor—the Merchant operating the POS terminal

Acquiring Technical Operator—Collects the Purchase and Purchase Cancellation Traces stored in the POS terminals and delivers to Purse Providers.

Funding Bank—Credits the Purse Provider (directly or via the Loading Operator), from the funding account, with the amount to be loaded in the chip card electronic purse.

Loading Operator—Operates Load Devices for accepting the cardholder's request for loading electronic money. These may or may not be POS terminals and loading operator may or may not be a Merchant.

Purse Provider—Loads electronic money into the purse and therefore controls the creation of electronic money and guarantees that electronic money.

Purse Scheme Administrator—Defines operational rules for and manages the purse system, e.g. VISA for the VISA Cash system.

Settlement—A process performed by the Purse Provider. Based on data from Purchase and Load transactions, payment is effected from the Purse Provider to the Acquiring Bank and, when loaded against other means of payment, from the Loading Operator to the Purse Provider.

SUMMARY OF THE INVENTION

We have discovered a method for using chip cards as a vehicle for delivering advertisement information to consumers and for electronically rebating the consumer with electronic money either for the delivery of that advertisement information or for the purchase of specific products. Preferably, our invention is used to deliver targeted advertisement information and to rebate the consumer for receiving that information and for purchasing the particular products associated with that information.

In a first aspect the invention features a method for providing advertisement information and associated rebates in connection with the use of a chip card of the type containing a memory. The method comprises downloading advertisement information onto the chip card when the card is used by the user. The advertisement information includes information identifying one or more products with which a rebate is associated. The advertisement information is stored on the chip card. During a purchase transaction when the chip card is used to purchase a product, the system determines whether a rebate is associated with the product being purchased, and if a rebate is associated with the product, a rebate in the form of electronic money is entered into the memory of the card during the purchase transaction. By "product" we mean either a tangible item such as food or clothes, but also services rendered where no tangible item is transferred in the transaction.

In a second aspect, the invention features a method of rewarding users with electronic money rebates for downloading advertisement information and associated rebates to their chip cards. The method comprises downloading advertisement information onto the chip card when the card is used by the user, storing the advertisement information on the chip card, and entering a rebate in the form of electronic money into the memory of the card as a reward to the user for downloading the advertisement information.

Advantages of the invention can include one or more of the following. The invention provides a means for a consumer to redeem coupons at the point of purchase and yet allow the retailer to receive full price for all items being purchased. The retailer does not to have to get involved in the redemption of coupons; where previously retailers were forced to carry large accounts receivable associated with the money owed to them by coupon clearinghouses and manufacturers, they can now receive the full, non-discounted price for the transaction. Handling and processing costs normally associated with paper coupons will be significantly reduced. The invention may also motivate the consumer to make future purchases because the incentive in the form of electronic money is not 'exercised' immediately at the time of purchase as in the case of a coupon discount, but rather the electronic money is designed to be used at a subsequent purchase or other transaction. The invention is superior to other forms of chip card based loyalty systems in that the consumer receives electronic money as opposed to 'points'. The points can be redeemed by only one or, at most, a limited number of commercial entities; electronic money, on the other hand, will be as ubiquitous as the use of chip cards which can already be used in place of hard currency in a variety of locations. It also provides a means of automatically distributing advertising revenues to the various parties via electronic financial transaction networks.

The system preferably includes a plurality of cards incorporating integrated circuits ("chip cards") and a communication and processing network for loading advertisement or sales promotion (ASP) data to and from a chip card and for performing financial transactions electronically. The communication network is preferably comprised of one or more point-of-sale (POS) terminals which communicate with the chip cards at the time of sale; a first computer network capable of communicating with the POS terminals via a communication channel such as standard telephone lines or Ethernet-based local area networks (LAN's), or wide-area networks (WAN's) typically termed the "merchant acquirer network" or "acquirer"; a second computer network capable of communicating with the acquirer via the communication channels just mentioned, and bills the consumer for any credit charges—typically termed the "Card Issuer" or "Issuer"; a third computer network capable of communicating with both the Acquirer and Issuer networks and which manages the process of collecting storing and distributing the ASP content—termed the "Advertising Affinity Operator" or "Affinity Operator"; and the Advertiser generating the ASP content. The Acquirer and Issuer networks may be combined in a single or distributed network and may also incorporate the Affinity Operator network into a single network resulting in a configuration comprising only the chip card, the chip card reader, and the transaction network made up of the Acquirer, Issuer, and Affinity Operator functions.

The communication and processing network for transmitting data to and from the chip card may or may not be the same as the communication and processing network engaged in the purchase transaction. For instance, the communication network would be separate in the case where the ASP was downloaded onto the chip card off of an Internet website using a personal computer or from a cellular phone with a chip card communication port and then the consumer subsequently uses the chip card to make a purchase which used the rebate stored on the chip card at a 'bricks-and-mortar' retail location. On the other hand, the communication network is integral to the credit card transaction network in the case where the ASP is downloaded to the chip card at the point-of-sale.

A particular ASP can be stored onto the chip card preferably based on customer information available either on the chip card or on the communication network. The ASP may also be loaded at the time a customer uses a chip card to purchase an item. The ASP may be served either directly from the POS terminal or in-store network or from the Affinity Operator's advertisement information server. In the case where the advertisement information server resides at the merchant location in either the POS terminal or the merchant's computer network, the ASPs would be loaded during electronic data capture, off-hours. ASP server decision rules for choosing which ASPs to load would also be loaded, if necessary, during electronic data capture. Information is stored on the customer's chip card, which allows the ASP server to determine which ASP is most appropriate for that particular customer. The types of items currently being purchased by the customer as well as the merchant type are combined with the chip card information to determine which ASP is served to the chip card.

At the time a customer uses the chip card with the particular ASP to purchase the associated item, the rebate associated with that ASP is converted from having a potential monetary value (i.e., purchases cannot yet be made with the monetary value) to real value, or electronic money, in a so-called electronic purse that can be used for purchases. In distinction to current practice, the incentive value is not deducted from the amount due from the consumer to the retailer. The retailer thus receives full price from the consumer and no longer needs to concern themselves with either managing paper coupons or with having to wait for the refund from the various coupon clearinghouses or manufacturers. This electronic money as a result of the purchase of the item and use of the ASP can be stored in the chip card memory in a number of possible forms such as being added to a single value that represents stored cash value or modifying a flag associated with the ASP that indicates that the monetary incentive value is available for use in purchases. There may also be a means for allowing for the multiple use of the rebate associated with the ASP so that the rebate is available for more than one purchase. For instance, the multiple rebate capability may take the form of Loyalty Rebating in which the rebate value is increased as more purchases of that item are made by the consumer.

Alternatively, the rebate may not be stored on the chip card, but rather would be stored either at the point-of-sale or on the communication and processing network. At the time of purchase, the ASPs stored on the chip card would be compared with rebates available either at the point-of-sale or on the communication and processing network and the appropriate incentive rebate values determined and loaded onto the chip card electronic purse.

Additionally, electronic money may be put into the electronic purse as a result of loading the ASP onto the chip card, without any concomitant purchase of the product associated with that ASP. The system could be so configured such that the amount of electronic money loaded with each new ASP would be a function of how much information the consumer was willing to share to provide better targeting of the ASP provided; the more user-characterizing information allowed by the consumer for targeting, the more they would be rebated per ASP downloaded.

The chip card may or may not incorporate an electronic display for showing the advertisement directly on the card. If there is no display on the card, an ad can be stored as a text, sound, graphics, or video file such as JPEG or MPEG or as a pointer, e.g. a URL to an Internet site that has the advertisement.

Other embodiments may include one or more of the following features:

The step of varying the value of the rebate may be associated with a product based on purchases made by the user.

The value of the rebate may be varied based on the number of purchases the user has made.

The value of the rebate may be increased with increasing number of purchases of the product associated with the rebate.

The value of the rebate may be varied based on the duration over which the user has made purchases.

The value of the rebate may be increased with increasing duration over which the user has made purchases of the product associated with the rebate.

The chip card may have a flexible electronic display for display of the advertising information.

The display may list products that the card holder desires to purchase.

The display may also show the value of the rebates associated with the products listed.

The display may also show the total of rebates possible using all of rebates available for products on the list.

More than one list may be displayed to show products organized by product type, manufacturer, or merchant.

The advertising information may be downloaded using a personal computer from sites on a network such as the Internet.

The value of the rebate may be downloaded onto the chip card with the download of the advertisement information, and the step of entering the rebate into the memory of the card as electronic money may comprise loading the amount of the rebate into the electronic purse of the chip card.

The value of the rebate may be stored on a computer network or a point of sale terminal until the time of a purchase at which a rebate is made to the user.

The advertisement information may be downloaded to said chip card using one or more of the following devices: a cash register or other point-of-sale device, a personal computer, a portable chip card reader, a handheld device, a home or business telephone, a pay telephone, a vending machine, a cellular phone, a pager, a mass transportation payment station, a television and/or television set top box, and an automatic teller machine (ATM).

The rebate may be entered into the memory of the chip card by the user at one or more of the following devices: a cash register or other point-of-sale device, a personal computer, a portable chip card reader, a handheld device, a home or business telephone, a pay telephone, a vending machine, a cellular phone, a pager, a mass transportation payment station, a television, television set top box, and an automatic teller machine (ATM).

The rebate in the form of electronic money may be spent, transferred, or converted into coins or currency by the user using one or more of the following devices: a cash register or other point-of-sale device, a personal computer, a portable chip card reader, a handheld device, a home or business telephone, a pay telephone, a vending machine, a cellular phone, a pager, a mass transportation payment station, a television, television set top box, and an automatic teller machine (ATM).

Downloading to the chip card of advertising information may be blocked based on one or more of the following: (1) a family code associated with the advertisement information, (2) information identifying the manufacturer of the product, and, (3) the value of the rebate.

Product returns/refunds designed to fraudulently keep the rebate already stored on the chip card may be prevented by requiring that product refunds be processed using the same chip card, and by having the electronic money rebate that is associated with the returned product deducted from electronic money stored on the chip card.

Older advertisement information for which the associated rebate has not been redeemed may be purged from the chip card memory, so that memory is freed up for storing new advertisement information.

The electronic money of the rebate may be erased if not spent by an expiration date.

The advertisement information and rebates may be part of a retailer's private loyalty program.

Thumbnails of the advertisement information may be downloaded so the user can view the advertisement information on either a personal computer or on the chip card display.

The advertisement information may include a hyperlink or other Internet link so that user can insert the chip card into a computer or other Internet capable device and be linked to a website where a rebate can be redeemed or where previously redeemed electronic money from a rebate can be spent online.

Payment of the rebate may be made dependent on timing and/or frequency of cardholder purchases or visits to a particular store.

Payment of the rebate may be provided at multiple intervals.

The advertisement information may be loaded onto the chip card with a set date or range of dates when the rebate is valid.

The user's target preference level may be stored on the chip itself, to enhance protection of privacy.

The cardholder may be allowed to view the target preference level stored on the chip card by using a personal computer.

The value of the rebate may be greater for frequent, loyal shoppers than for shoppers that make one-time purchases only for a short time period.

The user may be paid a manufacturer's rebate and a retailer's rebate for the same purchase.

The Affinity Operator may also be the operator of the electronic purse.

Records of electronic money rebate payments to users may be maintained in a database for a time period for the purpose of permitting audits of the payment data by the manufacturers or other party that is paying for the rebates.

The manufacturer or issuer of the rebates may pay to the Affinity Operator an up front fee at the commencement of a rebate program, based on an estimate of rebates that the parties expect to be redeemed, and a settlement process occurs later, whereby the Affinity Operator may provide the rebate issuer with a reconciliation showing additional amounts due the Affinity Operator or any refunds due to the issuer based on the actual number of rebate redemptions that occurred. In the case of ATM 'cash machines', the ATM may allow for customer input regarding the type of product about which they are interested in receiving discounts and information on the ATM display during the time that the customer is waiting for the transaction to be processed.

When the purchase is made over the Internet, the customer would have a chip card reader connected to their personal computer. Since the bandwidth of the communication channel is sufficient to support real time download of at least text, sound, and graphics images (and short video files in the case of data rates rates higher than 100 kbps), the advertising server may be located on the Affinity Operator's network. Information characterizing the customer can be entered and stored either on the customer's personal computer or on the Affinity Operator's network. The invention may be used as part of a method for providing advertisement information and associated electronic money rebates in connection with the use of a chip card of the type containing a memory, the method comprising: downloading advertisement information onto the chip card when the card is used by the user; storing the advertisement information on the chip card; displaying the advertisement information either on a display built into the card or on a display on a device with which the card communicates; determining, when a particular product is purchased, whether there is an incentive associated with that particular product; and if the result of said determination is positive, then electronic money is stored non-volatilely in the chip card's memory.

The advertisement information stored on the chip card may be the advertisement information, itself, or an address or hyperlink (e.g., URL) to a location where the advertisement information is stored on a network with which the card communicates. The address or hyperlink may be associated with a thumbnail of the actual advertisement information. The thumbnail may have enough content to, itself, be advertisement information, or it may constitute only a hyperlink to the advertisement information.

The advertisement information downloaded to the chip card may be selected from a plurality of possible advertisement information, and the selection may be based at least in part on information characterizing the user.

The selection may be based at least in part on at least some of the user identification information stored on the card.

The downloading of the advertisement information onto the chip card may occur in connection with a transaction. The transaction may be a purchase made using the chip card to pay for the purchase. The purchase may be made at a POS terminal. The purchase may be of communication services using a card adapted to purchase the communication services. The communication services may comprise telephone service, and the chip card may be a telephone calling card. The purchase may be usage of a toll road, and the purchase may be made by wireless communication with the chip card as a vehicle containing the card passes a location on the toll road. Information identifying the downloaded advertisement information may be downloaded onto the chip card. At least some of the information characterizing the user may be stored in the memory of the chip card, or at least some of the information characterizing the user may be stored on a computer network to which the chip card can be connected. Stored on the chip card may be information representative of the number of times that the advertisement information has been displayed. Stored on the chip card may be information representative of whether the chip card has been used to purchase a product or service related to the advertisement information downloaded onto the chip card. Stored on the chip card may be information representative of whether the chip card has been used to purchase a product or service related to the advertisement information downloaded onto the chip card, and information representative of the number of times that the advertisement information has been displayed prior to the time of the purchase. The information can be stored on a computer network to which the chip card can be connected, or in a memory on the chip card as part of an affinity record.

The method may include downloading to the chip card information identifying the downloaded advertisement information; relating in a database the information identifying the downloaded advertisement information, the information representative of the number of times that the advertisement information has been displayed, and the information representative of whether the chip card has been used to purchase a product or service related to the advertisement information downloaded onto the chip card. This information may be related to information representative of the number of times that the advertisement information has been displayed prior to the time of the purchase. The information may be stored on the chip card, and may be uploaded from the chip card to the database, which resides on a computer network. The uploading of the information from the chip card may occur at the time the chip card is used in a transaction, or during the settlement and clearing operation performed following a transaction.

The method may include operating an advertising distribution service that receives advertisement information from advertisers, stores the advertisement information on a computer system connected to a computer network, and downloads the advertisement information over the computer network to the chip card.

The advertisement information may be downloaded to merchants in advance of downloading of the advertisement information to the chip card, the merchants may store the advertisement information locally, and the advertisement information may be downloaded, from the local storage, to the chip card at the time that the user enters into a transaction with the merchant. The advertisement information may be stored remotely from a merchant, and downloaded to the merchant and to the chip card at the time that the user enters into a transaction with the merchant. The transaction between the user and the merchant may occur over a computer network such as the Internet. The transaction between the user and the merchant may occur in an establishment to which the user physically travels. The transaction may occur at a POS terminal. The advertising distribution service may receive revenue for distributing the advertisement information, and may share a portion of the revenue with the merchant. The amount of advertising revenue shared with he merchant may be based generally on the number of times that the advertisement information is downloaded to a chip card.

The revenue may be shared with one or more of the following additional parties: merchant acquirer, network operator, and chip card issuer. The revenue may be shared with other parties by discounting fees that the party pays in connection with the user entering into a transaction using the chip card. The revenue may be shared with other parties by payments made by the advertising service to the party.

The advertising distribution service may receive user profile information that includes at least demographic information about the user. The user profile information for a user may be used in deciding which of a plurality of advertisement information is downloaded to the chip card of that user.

The advertising distribution service may receive information over the computer network representative of the number of times that the advertisement information has been displayed, may relate the information to the advertisement information, and may provide tracking information to the advertiser.

The tracking information related to the advertisement information may further include information indicating whether a product related to the advertisement information has been purchased using the chip card.

The tracking information related to the advertisement information may further include user profile information that contains at least demographic information about the user.

The user profile information may further include psychographic information about the user.

An advertising testing campaign may be conducted in which a plurality of advertisement information for the same product or service are distributed, loaded onto chip cards, and user profiles and information on number of times of display and on purchase data may be uploaded from the chip cards for theadvertisement information, and the information may be processed to determine which of the advertisement information should be used, or which of the advertisement information should be used with particular user profiles.

The chip card may have a flexible electronic display for displaying the advertisement information.

The information characterizing the user may comprise a multi-dimensional description of the user based on demographic, psychographic, or other customer preference data.

The advertisement information downloaded to the chip card may be based on the information characterizing the customer uploaded from the chip card, a set of decision rules, and data indicating the preferred customer type to receive the particular advertisement information.

A decision rule may be used in selecting the advertisement information to be downloaded, and the decision rule may be based on the distance in an n-dimensional user profile descriptor space between the user profile and a target profile for the advertisement information.

The decision rule may include a quota system, by which the total number of downloads of advertisement information to the chip card by a particular POS or other server is limited to a predetermined maximum.

The Affinity Operator may develop a set of decision rules to determine which advertisement information should be downloaded onto a user's card.

The Affinity Operator may collect user profile data, information identifying the advertisement information, and affinity records, incorporate the data into a database, and processed data contained within the database to develop and, on an ongoing basis, refine a predictive model of purchasing performance based on information contained with the database.

The information stored on the chip card may contain information identifying the specific product manufacturer or vendor, a product identification, and an indicator of how many displays of the advertisement information were performed prior to the customer's first purchase of the item or items advertised.

Stored on the card may be a value that indicates the generic class or classes into which a particular product falls.

Stored on the card may be a value that indicates a price range into which the selling price of a particular product falls.

Stored on the card may be a value that indicates the version of the advertisement information downloaded to the card to distinguish from among a plurality of versions of the advertisement information, each of the versions targeted to a different user type.

The information characterizing the user comprises a user profile generated from demographic, psychographic, or other specific product preference information along with a user identification.

The user identification may be encoded to hide the identity of the user from a database used for tracking the purchasing activity of the user.

The encoding may be done so that there exists a substantially one-to-one mapping between the encoded user identification and the actual user identification.

The user identification information may be a credit or debit card number. The card type and card issuer fields of the user identification information may be left unencoded.

The transaction may be a purchase-less transaction such as an ATM transaction.

The advertisement information may be advertising.

The advertisement information may be one or more sales promotions.

The advertisement information may be stored in a memory stored within the display.

The advertisement information may be stored in a memory on the chip card separate from the display.

At least one decision rule used to select advertisement information for downloading may be based on the current date or time, so that advertisement information can be downloaded at relevant dates or times, e.g., at times at which advertising might be most persuasive (e.g., just prior to a stored birthday, or during a promotional period).

The advertisement information may be targeted. Targeting is based on demographics, psychographics, and other customer preference information that is verifiable and auditable. The advertisement information can be context sensitive, e.g., if you are currently involved in purchasing audio equipment, you don't get an ad for toothpaste. The results of an advertising campaign are auditable and provide more than just a measure of the rate at which users click on a particular internet advertising banner, but instead provide a measure of whether or not the advertisement information resulted in additional sales leads, sales, or other traditional measures of advertising return on investment (ROI). The invention has a method for tracking and measuring the impact of frequency, i.e. the number of times advertisement information should be displayed to a particular customer before reaching the point of diminishing returns.

Other features and advantages of the invention will be apparent from the following description, including the figures, and from the claims.

DETAILED DESCRIPTION

Figure 1:
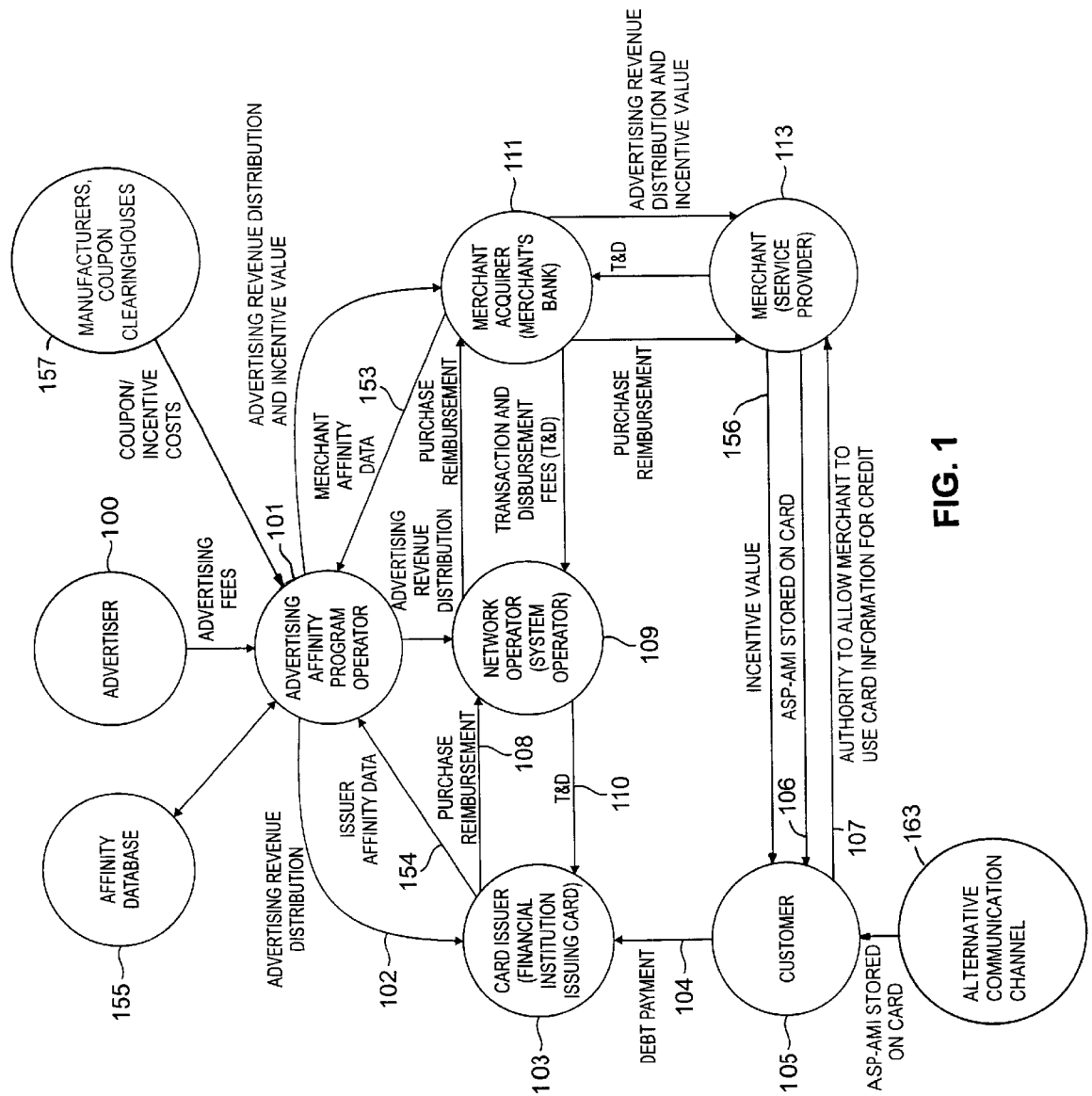
FIG. 1 is a flow diagram of a process for storing advertisement information (ASPs) on a chip card and distributing resulting revenue to the various parties involved in the transaction.
Figure 2:
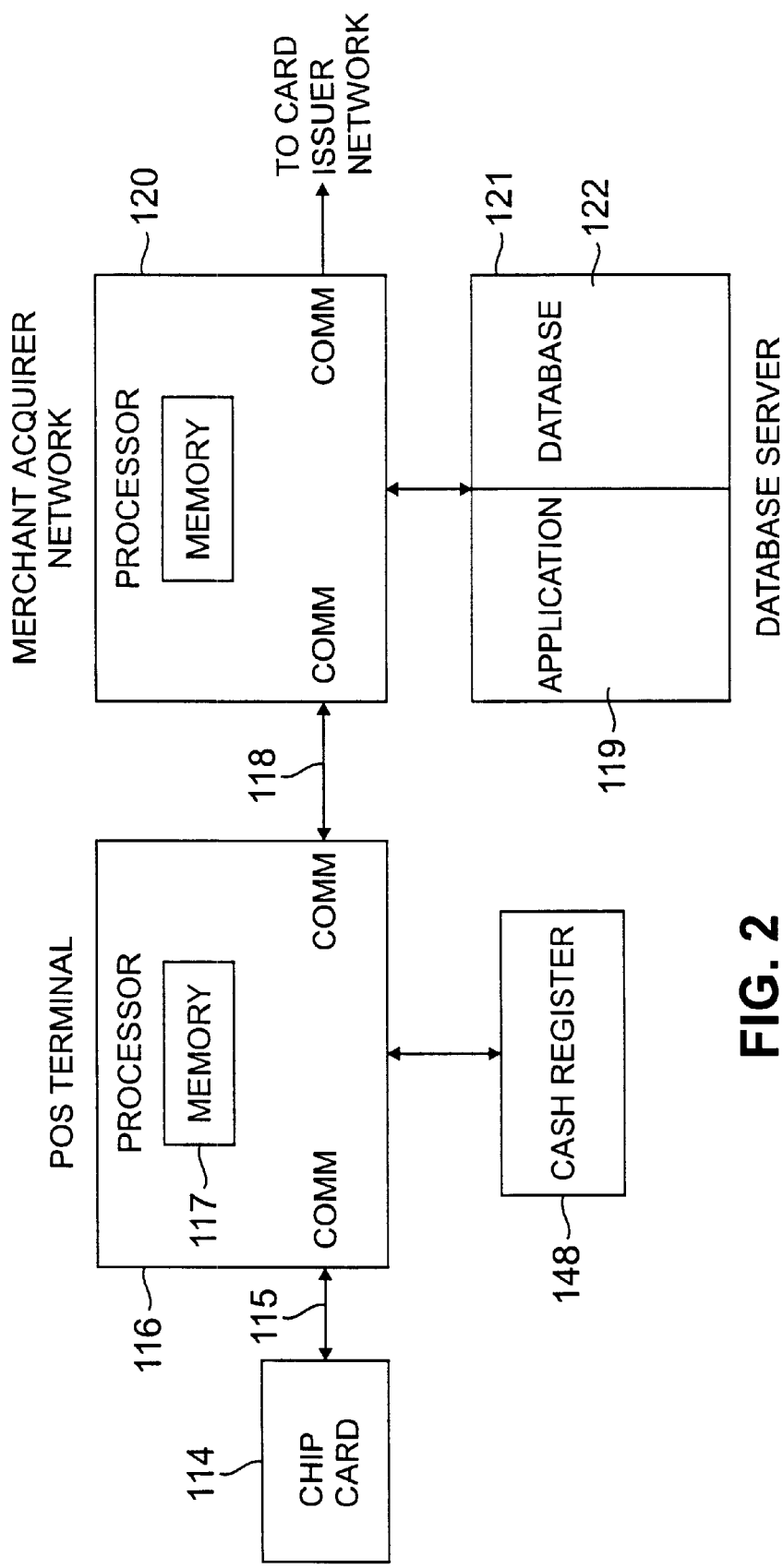
FIG. 2 is a diagram of a typical retail application with a point-of-sale (POS) terminal.
Figure 3:
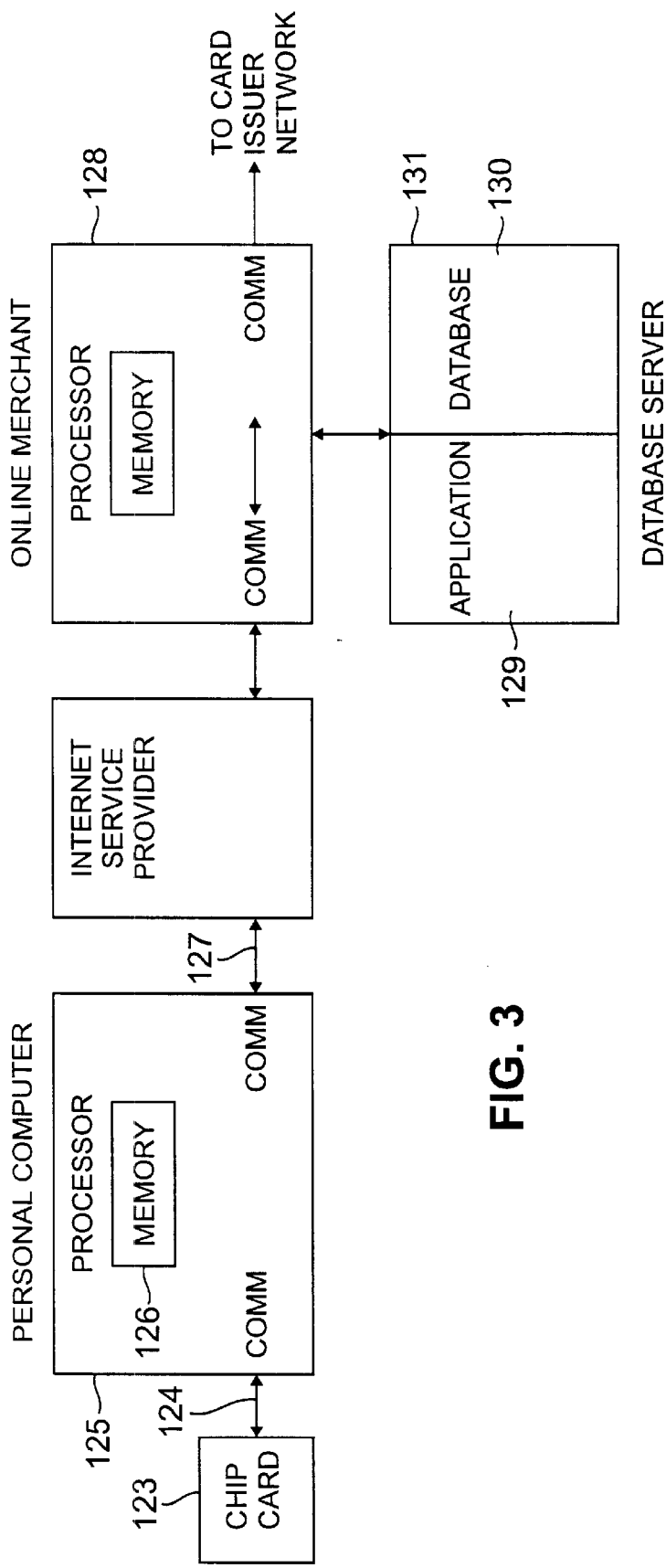
FIG. 3 is a diagram of a typical online application with personal computer and chip card reader.

Referring to FIGS. 1 and 2, a system stores an advertisement and/or sales promotion (ASP) with associated electronic money rebate 106 on a chip card 123 via two possible modalities: (1) when a consumer 105 visits a merchant 113 at either an on-line or retail store and purchases an item using the chip card; or (2) via alternative communication channels 163 such as, e.g., a personal computer connected to the Internet, a portable chip card reader, a point-of-sale (POS) terminal, a handheld device, a home or business telephone, a vending machine, a cellular phone, a pager, a mass transportation payment station, a television and/or television set-top box, or an automated teller machine (ATM).

The ASP 106 can take the form of an electronic coupon that includes a product UPC (Universal Product Code) and a rebate value. It can include text, graphics (e.g., JPEG images and MPEG video), and sound for presentation either on the chip card, on a computer monitor, or on a chip card reader display. The ASP can also include a hypertext link or an HTML (Hypertext Markup Language) or WML (Wireless Markup Language) document. The links can transfer a consumer to an on-line store when a browser (e.g., Microsoft Internet Explorer) presents the link or to an HTML or WML document. This feature enables less Internet-savvy consumers to easily navigate to a website.

Figure 4:
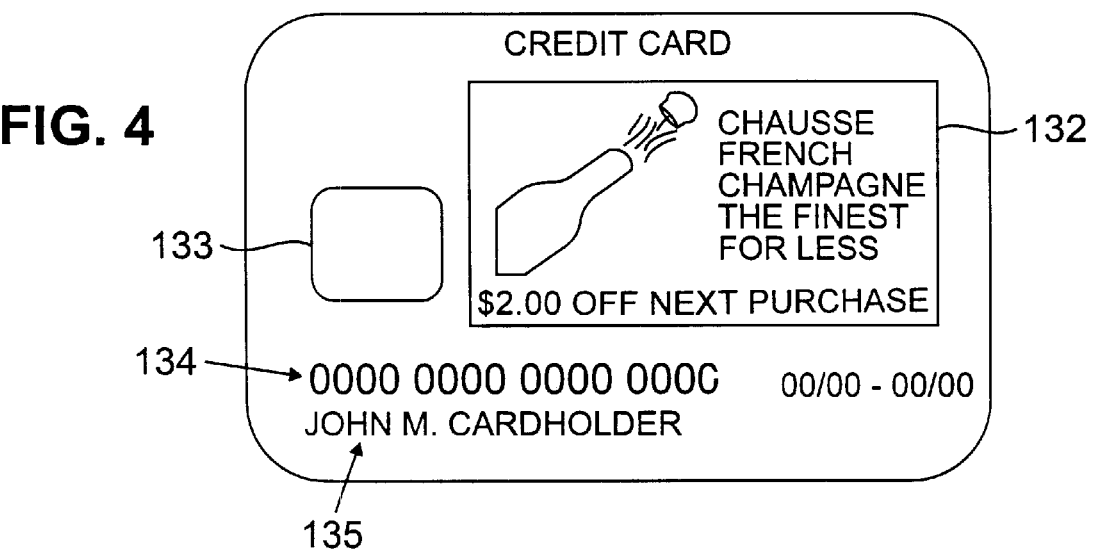
FIG. 4 is a drawing of a chip card with display showing both kinds of advertisement information: advertising and a sales promotion.
Figure 5:
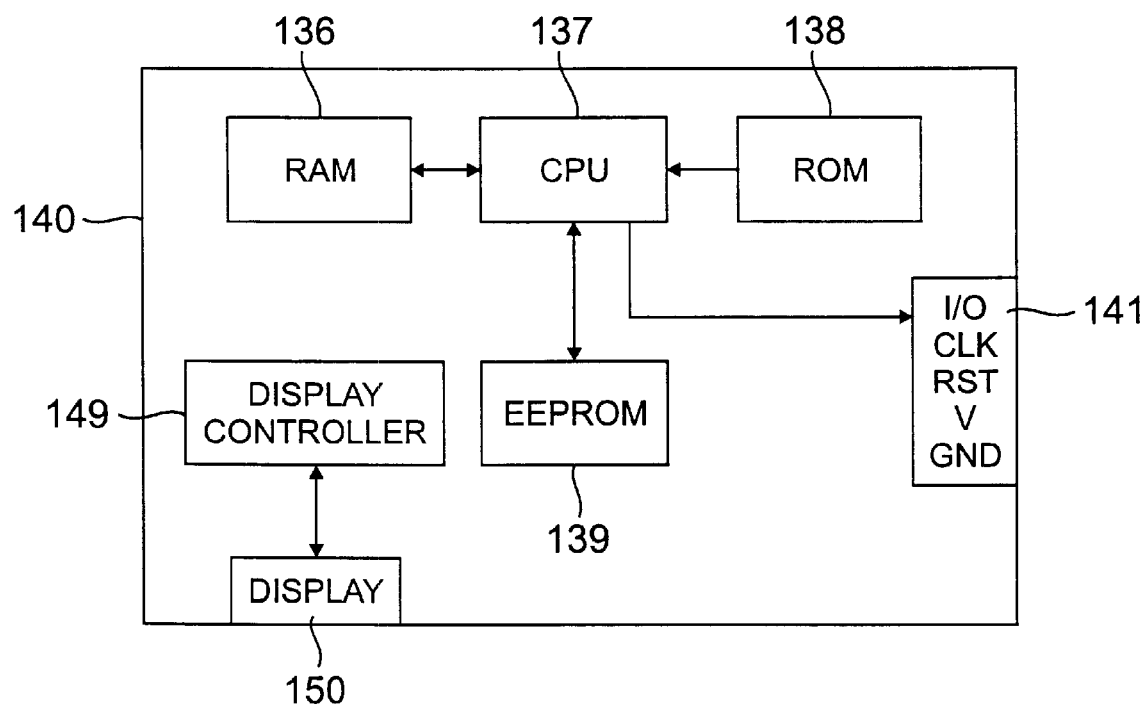
FIG. 5 is a diagram of the chip card architecture and electrical interface.

Referring to FIGS. 4 and 5, a chip card 140 includes memory 139 for storing information for one or more ASPs 106. A chip card 140, such as the chip card described in U.S. Pat. No. 6,019,284, can also include a display 132. Such a chip card can display advertisement information to a user (e.g., provide a continual reminder to redeem an electronic coupon). The advertisement information can alternatively be stored in memory within the display itself.

Figures 6, 7, 8:
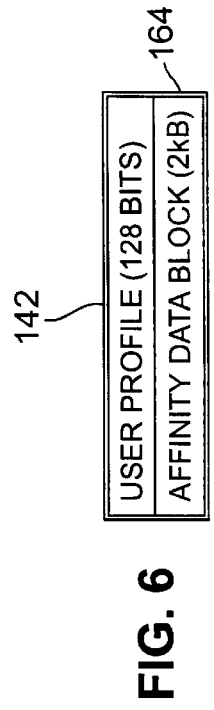
FIG. 6 is a description of the advertising affinity data structure stored on the chip card.
FIG. 7 is a description of the individual advertising data structure which makes up the affinity data block shown in FIG. 6.
FIG. 8 is a description of the data that is part of the incentive record shown in FIG. 7.

At the time of a transaction, e.g., a purchase, the Merchant 113 calculates the amount of purchase and asks the consumer 105 for payment. The Merchant 113 inserts the chip card 114 into the POS terminal 116 and communication is established between the chip card 114 and the terminal 116 via serial data channel 115. Referring to FIGS. 4–6, the serial communication channel is accomplished by electrical contacts 133 and communication signals 141 of the chip card 114. The amount of the sale is either hand-entered or transmitted by the cash register 148.

If ASP download is accomplished at the point-of-sale (POS), the ASP would preferably be targeted to a particular customer as described in more detail in co-pending application U.S. Ser. No. 09/457,988 "Chip Card Advertising Method and System". Targeting of the ASP would preferably be accomplished by the following method: Referring to FIG. 6, the USER PROFILE data field 142 is transferred from the chip card 114 to the POS terminal 116.

The USER PROFILE data field 142 (information characterizing the card user) is preferably 128 bits long and is composed of preferably 4 bit fields, each representing a value or numeric score for the user relative to a specific demographic, psychographic, or other measure. In the case of a 128 bit word with 4 bit fields, the USER PROFILE data field 142 provides a 30-dimensional descriptor matrix of the factors affecting a customer's buying habits. Based on traditional marketing techniques such as customer interviews and questionnaires and focus groups, a user profile or set of profiles will be developed that are believed to be the optimum group to which the chip card ASP should be targeted. Additionally, the advertiser may wish to test market to other user profiles that may have produced equivocal results by traditional marketing, but for which the advertiser wishes to gather actual data using the chip card evaluated based on models generated from the data in the Affinity Network database. Based on the above-mentioned methods, the target user profile or profiles are chosen by the Advertiser 100 in conjunction with the Affinity Operator 101. Additionally, target profiles may include such non-customer-related factors as the nature of the items currently being purchased by the customer; for instance, if the customer were purchasing a loaf of bread, the ASP downloaded might be one for a related item like butter, or it might be for a competitor's bread.

In the case of credit/debit card transaction, Merchant 113 transmits the credit card data and sales amount with a request for authorization of the sale to their Acquirer 111 or Network Operator 109, if there is one, typically by phone line but sometimes by Internet. The Network Operator 109, if present, performs settlement and clearing functions, enforces rules and regulations, handles security issues, and maintains the float pool. Point of sale units 116 are usually set to request authorization at the time of sale, and then actually capture the sales draft at a later time. The Acquirer 111 that processes the transaction also routes the authorization request to the Issuer 103. The credit card number identifies type of card, issuing financial institution, and the cardholder's account (user identification information). If the cardholder has enough credit in their account to cover the sale, the Issuer 103 authorizes the transaction and generates an authorization code. This code is sent back to the Acquirer

111. The Issuer 103 puts a hold on the cardholder's account for the amount of the sale. The Acquirer 111 processes the transaction and then sends the approval or denial code to the merchant's point of sale unit 116.

During the time that these preceding transactions are taking place to obtain authorization, the POS terminal 116 downloads the chosen ASP to the chip card. A new Affinity record is created in the Affinity data block on the chip card containing the VENDOR ID 143, PRODUCT ID 144, PRODUCT TYPE 145, ASP VERSION 151, PRODUCT COST 146, and LOADS UNTIL PURCHASE 147 fields associated with that particular ASP. There may be more than one version of the ASP for a particular product for reasons of targeting the message to particular customer groups, therefore a data field is provided, ASP VERSION 151, which indicates which ASP has been downloaded. Additionally, the chip card's Affinity Records are uploaded to the POS terminal 116 and compared to items currently being purchased. If a match is found between the PRODUCT ID 144 and any of the purchased product's UPCs, then the following algorithm is performed:

```
If match then
    If (PURCHASED ==FALSE) then *if it hasn't yet been
        purchased*
    {if LOADS_UNTIL_FIRST_PURCHASE <7 then
        LOADS_UNTIL_FIRST_PURCHASE ++;
        PURCHASED ==TRUE;
    }
    else *no match to ASP*
    {if LOADS_UNTIL_FIRST_PURCHASE <7 then
        LOADS_UNTIL_FIRST_PURCHASE ++;
    }
```

The data value LOADS_UNTIL FIRST PURCHASE is the number of downloads of that particular ASP that were needed before a purchase was first made by the card holder. The Affinity Record for the particular ASP that was loaded to the card along with the credit card number is saved in POS memory for upload to the Affinity Operator 101 or Acquirer 111 during subsequent electronic data capture.

The POS terminal 116 will read the Incentive Record 163 of the Affinity Record of all ASPs stored on the chip card 114 to determine which have rebates associated with products that are currently being purchased. There may also be a list of pointers within the Affinity Data Block 164 to all ASPs which have rebates in order to speed processing by the POS terminal 116.

For all ASPs with rebates, the rebate amount is determined. Preferably, the rebate amount is determined by the POS terminal 116, though determination may occur within the chip card or remotely for example on the Internet. The determination is preferably performed in the following manner: 1) determine if any rebates are still available by reading the REBATES AVAILABLE field 159 of the INCENTIVE RECORD 163; 2) if rebates are still available then determine value of rebate by reading BASE REBATE field 158 of the INCENTIVE RECORD 163; 3) determine if the LOYALTY REBATE FLAG 160 is set; 4) if the LOYALTY REBATE FLAG 160 is set then determine the Loyalty rebate amount by reading LOYALTY REBATE INCREASE (LRI) 161 and NUMBER OF PURCHASES MADE 162. The rebate is calculated based on the following formula:

$$\text{Actual REBATE} = (\text{BASE\_REBATE} * (1 + (\min(\text{MAX\_REBATE}, \text{NUMBER\_OF\_PURCHASES\_MADE}) * \text{LRI}))127$$

In the formula, the smaller of the two values $\text{MAX}_{13}$ REBATE and NUMBER_OF_PURCHASES_MADE is chosen for the calculation so as to provide a means of saturating the function when a maximum desired rebate value has been achieved. Loyalty Rebating causes the rebates to increase as a consumer purchases more of a particular product. The Loyalty Rebating can be optimized to incentivize a consumer around different parameters. For instance, if the dates of purchase are stored along with the NUMBER_OF_PURCHASES_MADE 162, then the consumer can be rewarded for either frequency of purchases (how many within a certain period), length of time they have been purchasing the product (loyalty), or for how regular a customer they have been (regularity). Loyalty Rebating may also use a non-linear function for determining the rebate value, for instance, the consumer might be required to purchase more than one item before a rebate was received, in which case a flag indicating non-rebated purchases would be used to implement that functionality. The non-linear function might also take the form of a polynomial equation, logarithmic, or other mathematical or logical expression.

Alternatively, information on rebates may not be stored on the chip card, but rather may be stored either at the point-of-sale or on the communication and processing network. At the time of purchase, the ASPs stored on the chip card would be compared with rebate information available either at the POS or on the communication and processing network, and the appropriate rebate amounts determined and loaded onto the chip card electronic purse.

Other embodiments may have the BASE_REBATE 158 field of the INCENTIVE_RECORD 163 stored on the POS terminal 116 or on the communication and processing network while still maintaining the other portions of the INCENTIVE_RECORD 163 on the chip card. In this way, merchants and others can dynamically adjust and control the incentive program while still allowing for Loyalty Rebating using the remaining data available in the ASPs INCENTIVE_RECORD 163.

Once a determination of the actual rebate value has been made, the rebate needs to be added to the stored value already in the chip card's memory. Preferably, the rebate will be added to chip card memory locations that provide what is termed electronic purse functionality. The rebate value may also remain distinct from the chip card's electronic purse function by providing each ASP with a rebate field and treating the ASPs, in effect, as a distributed electronic purse. Preferably, the rebate value storage scheme used will be in compliance with industry standards such as the CEPS and EMV standards, along with purse scheme administrator standards such as VISA's VCEPS standard and the Mondex standard. Alternatively, the rebate may not be added to chip card memory until the consumer 105 connects the chip card into a secondary device such as a chip card reader connected to a personal computer, a cell phone, or a portable chip card reader that may even be at a different location such as a home. At that point, the chip card would, for instance, be inserted into a chip card reader connected to a personal computer and the electronic money loaded onto the chip card at that time. By including an additional flag indicating whether a rebate or rebates was due to the consumer in the INCENTIVE_RECORD 163, and then having the secondary device determine the state of this flag, this alternative scheme could be accomplished.

The specific implementation of rebate value storage will depend on the type of electronic purse scheme used by the Purse Provider. In transactions which provide authorization from the issuer, typified by credit and debit card transactions, the electronic money would preferably be downloaded to the chip card at the time of authorization when the card is used for purchase. This is a stored value load transaction where the funding bank would preferably also be the Affinity Network Operator. This type of system could be used when the chip card used had credit card as well as electronic purse functionality. In the case of the credit/debit type of transaction, the rebate stored value is not transferred to the chip card 114 until the credit authorization has been completed.

In cases where the chip card has only electronic purse functionality, there are two distinct types of purse schemes. In unlinked purse schemes, as typified by the Mondex electronic purse, the stored value is not linked back to any funding account, i.e., there is no cardholder necessarily associated with the money. Stored value in unlinked purses are much like paper currency whose transaction history cannot be easily traced. Linked electronic purse systems, as typified by VISA Cash®, are referenced to a funding account or account holder, thus providing better trace-ability. In both the linked and unlinked purse systems, no online authorization is required for the transaction to take place; the POS terminal 116 and the chip card 114 provide mutual authentication, encryption and authorization as needed without the assistance of any central fiscal authority. In the case of linked purse systems, the rebate is accomplished when stored value is transferred from the POS 116 to the electronic purse on the chip card 114. A record of the rebate stored value transfer is stored at the Merchant 113 until some later time, typically after the retail establishment has closed, when all stored value transactions are batch-processed and transmitted back to the Acquirer 111 for settlement. One data item in the record describing the rebate stored value transfer is the funding bank identifier, i.e., the financial institution that will be paying for the rebate. This rebate stored value is in fact an electronic instrument of credit rather than stored value 'cash' since it represents a 'loan' of stored value from the purse operator to the rebate funding bank.

In an unlinked purse system, stored value transactions are not associated with any account information, and the individual transactions are accumulated and transmitted in a set of total amounts in a process called aggregation. In this case, the rebate stored value transactions would be aggregated separately from the purchase stored value transactions, allowing for proper settlement by the participating financial institutions.

Since the stored value on the chip card is honored by the Merchant 113 as cash, the consumer may, in fact, ask to redeem the stored value while still at the POS terminal 116.

Additionally, stored value may be put into the electronic purse as a result of loading the ASP onto the chip card, without any concomitant purchase of the product associated with that ASP. The system could be so configured such that the rebate amount for each new ASP would be a function of how much information the consumer was willing to share to provide better targeting of the ASP provided; the more information allowed by the consumer for targeting, the more they would be rebated per ASP downloaded.

The POS terminal 116 or cash register 148 prints out a sales draft, or slip. The merchant asks the Customer 105 to sign the sales draft, which obligates them to reimburse the Issuer 103 for the amount of the sale. At a later time, probably that night when the Merchant 113 is closing up, the merchant reviews all the authorizations stored in the POS terminal 116 against the signed sales drafts. When all the credit card authorizations have been verified to match the actual sales drafts, the merchant undertakes a settlement and clearing process in which the merchant 'captures', or transmits, the data on each authorized credit card transaction to the Acquirer 111 for deposit. This is in lieu of depositing the actual signed paper drafts with the Acquirer 111. The Acquirer 111 performs what is called an interchange for each sales draft, with the appropriate Issuer 103. The Issuer 103 transfers the amount of the sales draft, minus a transaction and disbursement fee 110 to the Acquirer 111. The Acquirer 111 then deposits the amount of all the sales drafts submitted by the merchant 113, less a discount fee (e.g., proportional to the volume of advertisement information the merchant has downloaded onto chip cards), into the merchant's bank account.

Stored value settlement functions slightly differently from credit/debit settlement. The Acquirer 111 informs the Purse Provider of all stored value transactions using that particular purse system. The electronic value is transferred from the Acquirer 111 to the Purse Provider who, in exchange, reimburses the Acquirer along with any interchange or loading fees. The payment may be made via financial electronic data interchange (EDI), via money transfer using an Automated Clearing House Association, or by conventional paper check. The Acquirer 111 credits the Merchant 113 for the purchase transactions and rebate stored value.

On a regular basis, and preferably at the time of electronic data capture (settlement and clearing), the Merchant 113 will transmit all the Affinity Records and associated card numbers stored on the retail location's POS terminals 116 preferably to the Acquirer 111. Prior to sending the data on to the Affinity Operator 101, the Acquirer 111 preferably encrypts the credit card number using application software 119 residing on the Acquirer's Database server 121 so that the cardholder's identity and account information remain unknown to the Affinity Operator 101. By using the appropriate encryption algorithm, e.g. a symmetric key algorithm like IDEA (International Data Encryption Algorithm) or Triple DES (Data Encryption Standard) with a key known only to the Acquirer 111 and Issuer 103, the cardholder information can be hidden from the Affinity Operator 101. In the preferred embodiment, the Acquirer removes the leading digits of the credit card number which identify the card type (e.g. VISA, MasterCard, American Express) and Issuer ID number, and then proceeds to encrypt the remaining digits of the card number using the appropriate encryption algorithm. The Acquirer then appends the Card type and Issuer ID number back onto the cipher text and transmits this, along with the Affinity Record to the Affinity Operator 101. The Acquirer 111 repeats this for all Affinity Record/card number pairs.

As part of the data transfer protocol between the Acquirer 111 and Affinity Operator 101, the Acquirer identifies itself by its assigned ID number prior to transferring data to the Affinity Operator. The Affinity Operator 101 uses this ID along with the Affinity Record/card number pairs to create records in its Affinity Database 155. The Affinity Database records contain fields for at least the following information: Date of ASP download; card type; issuer ID; acquirer ID; encrypted cardholder ID (one form of user identification information); Product vendor ID; Product type; Product cost; Loads until first purchase; ASP version; and User profile. Also included in the data transfer protocol is an acknowledgement of receipt message from the Affinity Operator 101 to the Acquirer 111 that indicates the number of records received. Based on the acknowledged number of records received, the Affinity Operator 101 makes payment to the Acquirer 111 on a preferably per record basis of an amount mutually agreed to by both parties. The payment may be made at the time of data transfer via financial electronic data interchange (EDI), via money transfer using the National Automated Clearing House Association, or by conventional paper check at a later time. There will be multiple Acquirers participating in the download of ASPs 106 onto chip cards 123; the total number of downloads for each ASP across all Acquirers is tallied and the Affinity Operator 101 charges the Advertiser 100 based on that total.

Application software resides on the Issuer's Network which transforms the cardholder data residing on the Issuer Network into the previously mentioned 128 bit USER PROFILE 142 data. On a regular basis the Issuer 103 will transmit any USER PROFILE 142 updates to the Affinity Operator 101. Prior to sending the data on to the Affinity Operator 101, the Issuer 103 preferably encrypts the credit card number so that the cardholder's identity and account information remain unknown to the Affinity Operator 101. By using the appropriate encryption algorithm, e.g. a symmetric key algorithm like IDEA (International Data Encryption Algorithm) or Triple DES (Data Encryption Standard) with a key known only to the Acquirer 111 and Issuer 103, the cardholder information can be hidden from the Affinity Operator 101. In the preferred embodiment, the Issuer removes the leading digits of the credit card number which identify the card type (e.g. VISA, Mastercard, American Express) and Issuer ID number, and then proceeds to encrypt the remaining digits of the card number using the appropriate encryption algorithm. The Issuer then appends the Card type and Issuer ID number back onto the ciphertext and this, along with the USER PROFILE 142 is sent to the Affinity Operator 101. The Issuer 103 repeats this for all USER PROFILE/card number pairs. Based on the acknowledged number of records received, the Affinity Operator 101 makes payment to the Issuer 103 on a preferably per record basis of an amount mutually agreed to by both parties. The payment may be made at the time of data transfer via financial electronic data interchange (EDI), via money transfer using the National Automated Clearing House Association, or by conventional paper check at a later time.

As part of the data transfer protocol between the Issuer 103 and Affinity Operator 101, the Issuer identifies itself by its assigned ID number prior to transferring data to the Affinity Operator 101. The Affinity Operator 101 uses this ID along with the USER PROFILE/card number pairs to update records in its Affinity Database 155.

What is claimed is:

1. A method for providing advertisement information and associated rebates in connection with the use of a chip card containing a memory, the method comprising:

downloading advertisement information onto the chip card when the card is used by the user;

storing the advertisement information on the chip card, the advertisement information including information identifying one or more products with which a rebate is associated;

during a purchase transaction when the chip card is used to purchase a product, determining whether a rebate is associated with the product being purchased; and if a rebate is associated with the product, entering a rebate in the form of electronic money into the memory of the card.

2. A method for providing advertisement information and associated rebates in connection with the use of a chip card containing a memory, the method comprising:

downloading advertisement information onto the chip card when the card is used by the user;

storing the advertisement information on the chip card; and entering a rebate in the form of electronic money into the memory of the card as a reward to the user for downloading the advertisement information.

3. The method of claim 1, further comprising the step of entering a further rebate in the form of electronic money into the memory of the card as a reward to the user for downloading the advertisement information.

4. The method of claim 2 or 3, wherein the value of the rebate entered as a reward for downloading the advertisement information varies with a target preference level which specifies the amount of information that the user provides characterizing the user.

5. The method of claim 1, further comprising the step of varying the value of the rebate associated with a product based on purchases made by the user.

6. The method of claim 5, wherein the value of the rebate is varied based on the number of purchases the user has made.

7. The method of claim 6, wherein the value of the rebate is increased with increasing number of purchases of the product associated with the rebate.

8. The method of claim 5, wherein the value of the rebate is varied based on the duration over which the user has made purchases.

9. The method of claim 8 wherein the value of the rebate is increased with increasing duration over which the user has made purchases of the product associated with the rebate.

10. The method of claim 1 where the chip card has a flexible electronic display for display of the advertising information.

11. The method of claim 10 wherein the display lists products that the card holder desires to purchase.

12. The method of claim 11 wherein the display also shows the value of the rebates associated with the products listed.

13. The method of claim 11 wherein the display also shows the total of rebates possible using all of rebates available for products on the list.

14. The method of claim 11 wherein more than one list can be displayed, to show products organized by product type, manufacturer, or merchant.

15. The method of claim 1 wherein the advertisement information is downloaded using a personal computer from sites on a network such as the Internet.

16. The method of claim 1, wherein the value of the rebate is downloaded onto the chip card with the download of the advertisement information, and the step of entering the rebate into the memory of the card as electronic money comprises loading the amount of the rebate into the electronic purse of the chip card.

17. The method of claim 1, wherein the value of the rebate is stored on a computer network or a point of sale terminal until the time of a purchase at which a rebate is made to the user.

18. The method of claim 1, wherein the advertisement information is downloaded to said chip card using one or more of the following devices: a cash register or other point-of-sale device, a personal computer, a portable chip card reader, a handheld device, a home or business telephone, a pay telephone, a vending machine, a cellular phone, a pager, a mass transportation payment station, a television and/or television set-top box, and an automatic teller machine (ATM).

19. The method of claim 1, wherein the rebate is entered into the memory of the chip card by the user at one or more of the following devices: a cash register or other point-of-sale device, a personal computer, a portable chip card reader, a handheld device, a home or business telephone, a pay telephone, a vending machine, a cellular phone, a pager, a mass transportation payment station, a television and/or television set-top box, and an automatic teller machine (ATM).

20. The method of claim 1, wherein the rebate in the form of electronic money is spent, transferred, or converted into coins or currency by the user using one or more of the following devices: a cash register or other point-of-sale device, a personal computer, a portable chip card reader, a handheld device, a home or business telephone, a pay telephone, a vending machine, a cellular phone, a pager, a mass transportation payment station, a television and/or television set-top box, and an automatic teller machine (ATM).

21. The method of claim 1 further comprising blocking the downloading to the chip card advertisement information based on one or more of the following:
  (1) a family code associated with the advertisement information,
  (2) information identifying the manufacturer of the product, and,
  (3) the value of the rebate.

22. The method of claim 1 further comprising preventing product returns/refunds designed to fraudulently keep the rebate already stored on the chip card by requiring that product refunds be processed using the same chip card, and by having the rebate electronic money deducted from electronic money stored on the chip card.

23. The method of claim 1 further comprising purging from the chip card memory older advertisement information for which the associate rebate has not been redeemed, so that memory is freed up for storing new advertisement information.

24. The method of claim 1 wherein the advertisement information and rebates are part of a retailer's private loyalty program.

25. The method of claim 1 further comprising downloading thumbnails of the advertisement information, so the user can view the advertisement information on either a personal computer or other presentation device, or on the chip card display.

26. The method of claim 1 further comprising storing as part of the advertisement information a hyperlink or other Internet link so that user can insert the chip card into a computer or other Internet capable device and be linked to a website where a rebate can be redeemed or where previously redeemed electronic money from a rebate can be spent online.

27. The method of claim 1 further comprising making payment of the rebate dependent on timing and/or frequency of cardholder purchases or visits to a particular store.

28. The method of claim 1 further providing for payment of the rebate at multiple intervals.

29. The method of claim 1 wherein the advertisement information loaded onto the chip card includes with it a set date or range of dates when the rebate is valid.

30. The method of claim 4 further comprising storing the user's target preference level on the chip itself, to enhance protection of privacy.

31. The method of claim 30 further allowing the cardholder to view the target preference level stored on the chip card by using a personal computer or other presentation device.

32. The method of claim 1 wherein the value of the rebate is greater for frequent, loyal shoppers than for shoppers that make one-time purchases only for a short time period.

33. The method of claim 1 further comprising paying the user a manufacturer's rebate and a retailer's rebate for the same purchase.

34. The method of claim 1 wherein the Affinity Operator is also the operator of the electronic purse.

35. The method of claim 1 wherein records of electronic money rebate payments to users are maintained in a database for a time period for the purpose of permitting audits of the payment data by the manufacturers or other party that is paying for the rebates.

36. The method of claim 1 wherein the manufacturer or issuer of the rebates pays to the Affinity Operator an up front fee at the commencement of a rebate program, based on an estimate of rebates that the parties expect to be redeemed, and a settlement process occurs later, whereby the Affinity Operator provides the rebate issuer with a reconciliation showing additional amounts due the Affinity Operator or any refunds due to the issuer based on the actual number of rebate redemptions that occurred.

37. The method of claim 2 where the chip card has a flexible electronic display for display of the advertising information.

38. The method of claim 37 wherein the display lists products that the card holder desires to purchase.

39. The method of claim 38 wherein the display also shows the value of the rebates associated with the products listed.

40. The method of claim 38 wherein the display also shows the total of rebates possible using all of rebates available for products on the list.

41. The method of claim 38 wherein more than one list can be displayed, to show products organized by product type of merchant.

42. The method of claim 38 wherein the advertising information is downloaded using a personal computer from sites on a network such as the Internet.

43. The method of claim 2, wherein the rebate is entered into the memory of the chip card by the user at one or more of the following devices: a cash register or other point-of-sale device, a personal computer, a portable chip card reader, a handheld device, a home or business telephone, a pay telephone, a vending machine, a cellular phone, a pager, a mass transportation payment station, a television, television set top box, and an automatic teller machine (ATM).

44. The method of claim 2, wherein the rebate in the form of electronic money is spent, transferred, or converted into coins or currency by the user using one or more of the following devices: a cash register or other point-of-sale device, a personal computer, a portable chip card reader, a handheld device, a home or business telephone, a pay telephone, a vending machine, a cellular phone, a pager, a mass transportation payment station, a television, television set top box, and an automatic teller machine (ATM).

45. The method of claim 2 further comprising blocking the downloading to the chip card advertising information based on one or more of the following:
  (1) a family code associated with the advertisement information,
  (2) information identifying the manufacturer of the product, and,
  (3) the value of the rebate.

46. The method of claim 2 further comprising purging from the chip card memory older advertising information for which the associate rebate has not been redeemed, so that memory is freed up for storing new advertising information.

* * * * *

UNITED STATES PATENT AND TRADEMARK OFFICE
CERTIFICATE OF CORRECTION

PATENT NO. : 6,450,407 B1
DATED : September 17, 2002
INVENTOR(S) : Gary A. Freeman and David H. Freeman It is certified that error appears in the above-identified patent and that said Letters Patent is hereby corrected as shown below:

Title page,
Item [63], Related U.S. Application Data, "continuation" should be -- continuation-in-part --.
Item [56], References Cited, U.S. PATENT DOCUMENTS,
"6,038,244" should be -- 6,039,244 --.
"6,149,778" should be -- 6,049,778 --.
"6,195,411" should be -- 6,095,411 --.
OTHER PUBLICATIONS,
The second reference, after "issues", insert -- associated --.
At "Active Ads,", "internet" should be -- Internet --.
At "Ferroelectric LCDs", "1991" should be -- 1992 --.
At "Publicard to Sell…", "Technolology" should be -- Technology --.

Column 1,
Lines 5-10, delete and insert the following: -- This application is a continuation-in-part of U.S. application Ser. No. 09/457,988, filed on Dec. 9, 1999, which is a continuation-in-part of U.S. application Ser. No. 09/061,879, filed on Apr. 17, 1998, now U.S. Pat. No. 6,068,183, incorporated herein by reference. It is related to U.S. Pat. No. 6,019,284 and U.S. application Ser. No. 09/457,990, also incorporated herein by reference. --

Column 2,
Line 59, after "printed", delete ",".

Column 3,
Line 62, after "at", delete ".".

Column 4,
Line 26, after "instance", delete ",".
Line 37, after "having", delete ";".
Line 51, after "can", "e" should be -- be --.

UNITED STATES PATENT AND TRADEMARK OFFICE
CERTIFICATE OF CORRECTION

PATENT NO. : 6,450,407 B1
DATED : September 17, 2002
INVENTOR(S) : Gary A. Freeman and David H. Freeman It is certified that error appears in the above-identified patent and that said Letters Patent is hereby corrected as shown below:

<u>Column 17,</u>
Line 34, "LOADS_UNTIL FIRST PURCHASE" should be
-- LOADS_UNTIL_FIRST_PURCHASE --.
Line 66, "$MAX_{13}$" should be -- MAX --.

Signed and Sealed this

Third Day of June, 2003

JAMES E. ROGAN
*Director of the United States Patent and Trademark Office*